(12) United States Patent
Horinouchi et al.

(10) Patent No.: US 7,839,750 B2
(45) Date of Patent: Nov. 23, 2010

(54) HOLOGRAPHIC RECORDING APPARATUS, HOLOGRAPHIC REPRODUCING APPARATUS AND HOLOGRAPHIC RECORDING AND REPRODUCING APPARATUS

(75) Inventors: Shogo Horinouchi, Fukuoka (JP); Shohei Inoue, Fukuoka (JP); Hideaki Horio, Fukuoka (JP)

(73) Assignee: Panasonic Corporation, Osaka (JP)

( * ) Notice: Subject to any disclaimer, the term of this patent is extended or adjusted under 35 U.S.C. 154(b) by 375 days.

(21) Appl. No.: 12/048,876

(22) Filed: Mar. 14, 2008

(65) Prior Publication Data
US 2008/0267039 A1    Oct. 30, 2008

(30) Foreign Application Priority Data
Mar. 16, 2007    (JP) .............................. 2007-068415

(51) Int. Cl.
*G11B 7/00*    (2006.01)
(52) U.S. Cl. .................................................... 369/103
(58) Field of Classification Search ................. 369/103, 369/44.23, 44.24, 112.01; 359/22; 365/176
See application file for complete search history.

(56) References Cited

U.S. PATENT DOCUMENTS

| 5,978,112 | A | * | 11/1999 | Psaltis et al. | 359/22 |
| 7,092,133 | B2 | | 8/2006 | Anderson | |
| 7,167,286 | B2 | | 1/2007 | Anderson | |
| 7,554,893 | B2 | * | 6/2009 | Kanaoka et al. | 369/103 |
| 7,593,304 | B2 | * | 9/2009 | Matsumoto et al. | 369/103 |
| 2004/0179251 | A1 | | 9/2004 | Anderson | |

FOREIGN PATENT DOCUMENTS

| JP | 2004-272268 | 9/2004 |
| JP | 2004-335044 | 11/2004 |

* cited by examiner

*Primary Examiner*—Nabil Z Hindi
(74) *Attorney, Agent, or Firm*—Dickinson Wright PLLC

(57) ABSTRACT

A holographic recording apparatus causes reference light and information light to interfere with each other, and records the interference pattern in a recording medium. The holographic recording apparatus has an objective lens and a focus position controller. The objective lens focuses both the reference light and the information light at a focus position of the recording medium. The focus position controller changes the focus position into a predetermined position on the light path of the reference light.

43 Claims, 21 Drawing Sheets

HOLOGRAPHIC RECORDING APPARATUS, HOLOGRAPHIC REPRODUCING APPARATUS AND HOLOGRAPHIC RECORDING AND REPRODUCING APPARATUS

FIELD OF THE INVENTION

The present invention relates to a holographic recording apparatus for recording information utilizing holography and a holographic reproducing apparatus for reproducing the information recorded using holography.

BACKGROUND OF THE RELATED ART

A holographic recording and reproducing apparatus using a transmissive recording medium is known as an apparatus utilizing holography. For example, U.S. Pat. Nos. 7,092,133 B2 and 7,167,286 B2 disclose examples of holographic apparatuses using the transmissive recording medium.

Referring to FIG. 18, an example of the holographic apparatus using the transmissive recording medium has a light source 101, a spatial laser modulator (SLM) 102, CCD camera 103, objective lens 104, polarizing beam splitters (PBS) 105a, 105b, 105c and mirrors 106a-106i. The SLM adds recording data to an emitted laser beam from source 101. CCD camera 103 reads reproducing light from a recording medium 107. A recording layer of recording medium 107 is set at a focus position of objective lens 104.

Regarding the holographic apparatus using the transmissive recording medium, a recording process will be described in FIG. 19 hereinafter.

Referring to FIG. 19, PBS 105a divides a laser beam emitted from light source 101 into two laser beams which are an information light beam and a reference light beam. The information light travels towards PBS 105b, and the reference light travels toward PBS 105c.

The information light penetrates PBS 105b, traveling towards SLM 102. SLM 102 adds the recording data to the information light. The information light enters PBS 105b again, being reflected by PBS 105b, traveling towards objective lens 104, and being focused on recording medium 107.

On the other hand, the reference light is reflected by PBS 105c, traveling toward mirrors 106a, 106b, 106c and 106d, and traveling toward recording medium 107. When the reference light enters mirrors 106b, the incident angle at recording medium 107 varies by changing the angle of mirrors 106b.

Accordingly, it is possible for the incident angle with the information light focused on objective lens 104 to be changed. Consequently, since interference pattern provided in recording medium 107 can be changed, multiple recording can be performed.

Now, the reproducing process will be described with reference to FIG. 20.

Referring to FIG. 20, light source 101 radiates a laser beam as a reference light. The laser beam penetrates PBSs 105a and 105c, traveling toward mirror 106e. Mirrors 106e, 106f, 106g, 106h and 106i lead the laser beam to recording medium 107. When the laser beam enters recording medium 107, the incident angle can be changed by mirror 106g.

When the reference light penetrates the interference pattern recorded on recording medium 107, the recording data is reproduced as reproducing light. The reproducing light penetrates objective lens 104 and PBS 105b, and is read by CCD camera 103. CCD camera 103 reproduces the recording data.

However, since a recording medium that incident laser beam penetrates is used for the above-mentioned hologram apparatus, the reproducing light is emitted on the opposite side to the incident side of the reference light during the reproducing process. An optical system is required to be located at both sides of the recording medium in order to reproduce the holographic recording data.

Therefore, since it is necessary to dispose the optical system at both sides of the recording medium, the number of parts for the recording and reproducing processes increases. Accordingly, it is difficult to downsize the hologram apparatus using the transmissive recording medium.

A holographic recording and reproducing apparatus using a reflective recording medium is known as a downsized hologram apparatus.

Referring to FIG. 21, an example of the holographic apparatus using the reflective recording medium has light source 101, SLM 102, CCD camera 103, objective lens 104 and PBSs 108a, 108b and 108c. The recording layer of recording medium 107 is disposed at a focus position of objective lens 104.

Regarding the holographic apparatus using the reflective recording medium, a recording process will be described with reference to FIG. 22.

Referring to FIG. 22, PBS 108a splits a laser beam emitted from light source 101 into two laser beams. The laser beam traveling toward SLM 102 is referred to as "information light," and the laser beam traveling toward PBS 108c is referred to as "reference light."

PBS 108a reflects the information light. SLM 102 adds recording data to the information light. The information light travels toward PBS 108b. When PBS 108b reflects the information light, it travels toward objective lens 104. Finally, the information light is focused on recording medium 107.

On the other hand, the reference light is reflected by PBS 108c, being focused through PBS 108c on recording medium 107 by objective lens 104.

Next, the reproducing process will be described with reference to FIG. 23.

The laser beam emitted from light source 101 is used as the reference light. The reference light travels toward objective lens 104 through PBSs 108a, 108b and 108c.

When an interference pattern provided in recording medium 107 diffracts the reference light, reproducing light indicating the recording data is generated. CCD camera 103 receives the reproducing light through objective lens 104 and PBSs 108b and 108c, reads out the recording data from the reproducing light, and reproduces the read recording data.

However, the holographic apparatus using the reflective recording medium maintain a constant position at which the information light and the reference light are focused in the thickness direction of the recording medium. Accordingly, since the interference area is constant, it is difficult to perform multiple recording using the reflective recording medium. Although a shifted multiple scheme is known as holographic method performing multiple recording, it has been desired to appear the holographic apparatus using the reflective recording medium and performing multiple recording.

SUMMARY OF THE INVENTION

To address the above-described problems, an object of the present invention is to provide, a holographic recording apparatus for recording information utilizing holography and a holographic reproducing apparatus for reproducing the information recorded using holography, which is capable of at least one process of multiple recording and multiple reproducing with the apparatus downsized.

One or more objects of the invention may be achieved by a holographic recording apparatus. The holographic recording apparatus makes reference light and information light interfere with each other, and records interference pattern in a recording medium by the interference. The holographic recording apparatus has an objective lens and a focus position controller. The objective lens focuses both the reference light and the information light at a focus position of the recording medium. The focus position controller changes the focus position into a predetermined position on light path of the reference light.

Accordingly, the holographic recording apparatus is capable of multiple recording process with the apparatus downsized.

One or more objects of the invention may be also achieved by a holographic reproducing apparatus. The holographic reproducing apparatus reproduces recording data by emitting reference light toward a recording medium. The holographic reproducing apparatus has an objective lens, a focus position controller, and a reproducing unit. The objective lens focuses the reference light at a focus position of the recording medium. The focus position controller changes the focus position into a predetermined position on light path of the reference light. The reproducing unit that reproduces recording data by receiving reproducing light reflected from the recording medium.

Accordingly, the holographic recording apparatus is capable of multiple reproducing process with the apparatus downsized.

One or more objects of the invention may be further achieved by a holographic recording and reproducing apparatus. The holographic recording and reproducing apparatus records interference pattern in a recording medium and reproduces recording data recorded in the recording medium. The holographic recording and reproducing apparatus has an objective lens, a focus position controller and a reproducing unit. The objective lens focuses both the reference light and the information light at a focus position of the recording medium. The focus position controller changes the focus position into a predetermined position on light path of the reference light. The reproducing unit reproduces recording data by receiving reproducing light reflected from the recording medium. If the recording data is recorded in the recording medium by making the reference light interfere with the information light, the focus position of the reference light being changed by said focus position controller. If the recording data is reproduced from the recording medium, the reference light is emitted toward the recording medium, the focus position of the reference light being changed by said focus position controller, both the reference light being reflected from the recording medium is transmitted toward said reproducing unit using the identical path with the information light.

Accordingly, the holographic recording apparatus is capable of both multiple recording and reproducing processes with the apparatus downsized.

BRIEF DESCRIPTION OF THE DRAWINGS

The accompanying drawings, which are incorporated in and constitute a part of the specification, illustrate presently preferred non-limiting examples of exemplary embodiments of the invention, and, together with the general description given above and the detailed description of the preferred embodiments given below, serve to explain the principles and concepts of the invention, in which like reference characters designate like or corresponding parts throughout the several drawings. Preferred embodiments of the present invention will now be further described in the following paragraphs of the specification and may be better understood when read in conjunction with the attached drawings, in which.

DETAILED DESCRIPTION OF THE INVENTION

Reference will now be made in detail to the presently non-limiting, exemplary and preferred embodiments of the invention as illustrated in the accompanying drawings. The nature, concepts, objectives and advantages of the present invention will become more apparent to those skilled in the art after considering the following detailed description in connection with the accompanying drawings. The following description is provided in order to explain preferred embodiments of the present invention, with the particular features and details shown therein being by way of non-limiting illustrative examples of various embodiments of the present invention. The particular features and details are presented with the goal of providing what is believed to be the most useful and readily understood description of the principles and conceptual versions of the present invention. In this regard, no attempt is made to show structural details of the invention in more detail than is necessary for the fundamental understanding of the present invention. The detailed description considered with the appended drawings are intended to make apparent to those skilled in the art how the several forms of the present invention may be embodied in practice.

Figure 1:
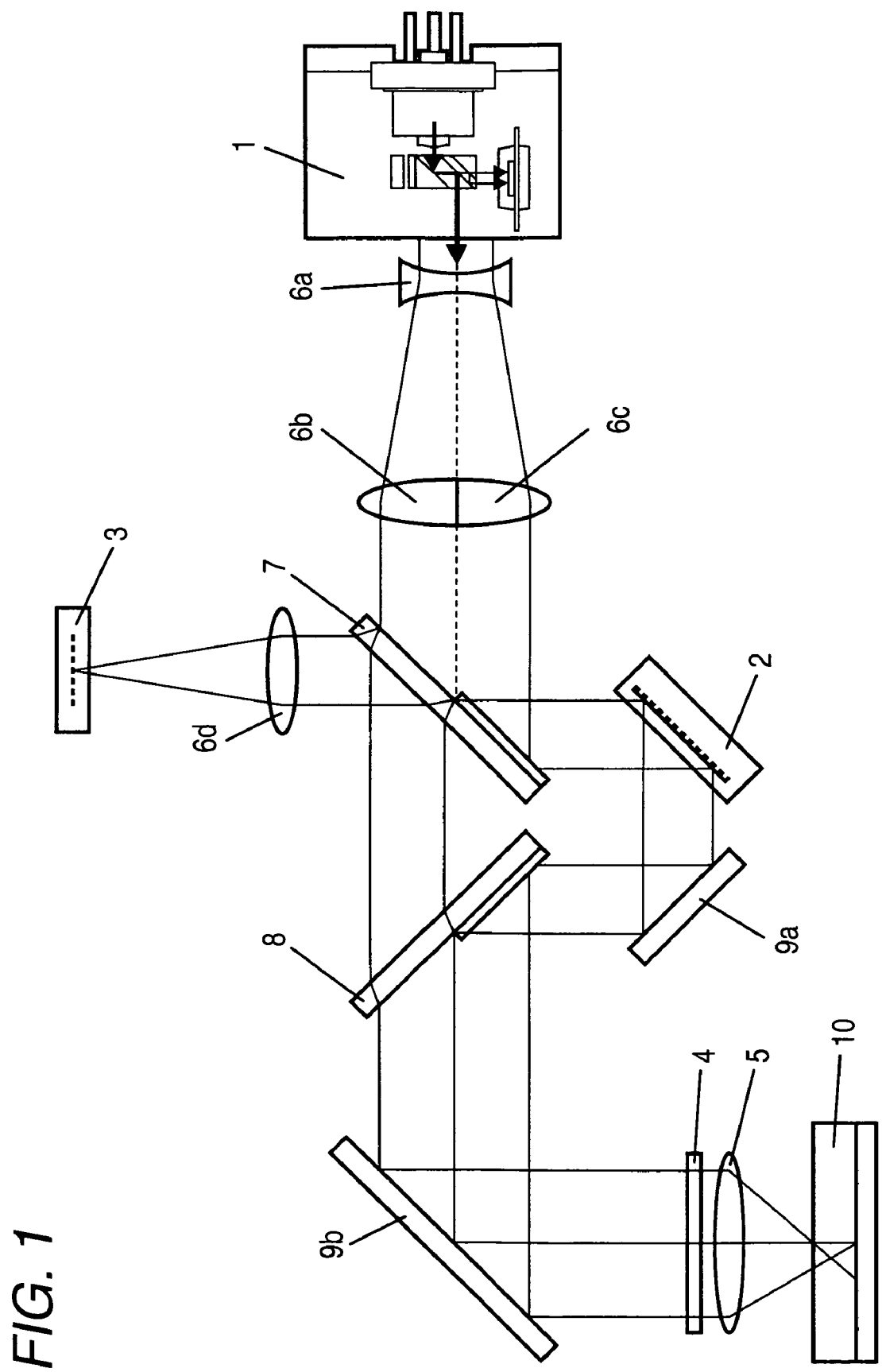
FIG. 1 illustrates a configuration of a holographic recording and reproducing apparatus according to a first embodiment.

FIG. 1 shows a holographic recording and reproducing apparatus using a focus position controller, which has a function of changing the focus position, before dispersing light emitted from a light source. Also, the holographic recording and reproducing apparatus has both a recording unit and a reproducing unit. The holographic recording and reproducing apparatus is referred to as a "holographic recording/reproducing apparatus" hereinafter.

Referring to FIG. 1, the holographic recording/reproducing apparatus has light source 1, spatial light modulator 2, CCD camera 3, quarter-wavelength plate 4, objective lens 5, lenses 6a, 6b, 6c and 6d, polarized beam splitter 7, penetrating glass 8 and mirrors 9a and 9b. In the holographic recording/reproducing apparatus, recording medium 10 is disposed at a reproducing and recording position. Light source 1 emits a laser beam. Spatial light modulator 2 is a reflective type device, having a plurality of image elements disposed in grid shape and having a function to add recording data to an incident laser beam. Spatial light modulator 2 is referred to as "SLM" hereinafter. CCD camera 3 is an example of a reproducing unit for reading out data from reproducing light. Quarter-wavelength plate 4 changes a phase difference of incident laser beams into an angle of 90 degrees, and is referred to as "QWP" hereinafter. Polarized beam splitter 7 is an example of a dispersing unit for changing both transmissivity and reflectivity by polarization of laser beam having a specific wavelength. Polarized beam splitter 7 is referred to as "PBS" hereinafter. Penetrating glass 8 has a reflection film as shown and described hereinafter.

Lenses 6b, 6c are a pair of lenses and lens 6b is an example of a focus position controller which is capable of moving along an optical axis of the laser beam emitted by source 1.

PBS 7 penetrates or passes S polarized light and reflects P polarized light. The reflection film is provided with PBS 7 so as to reflect all of the laser beam traveling from lens 6c.

A recording process will be described now with reference to FIG. 2.

Figure 2:
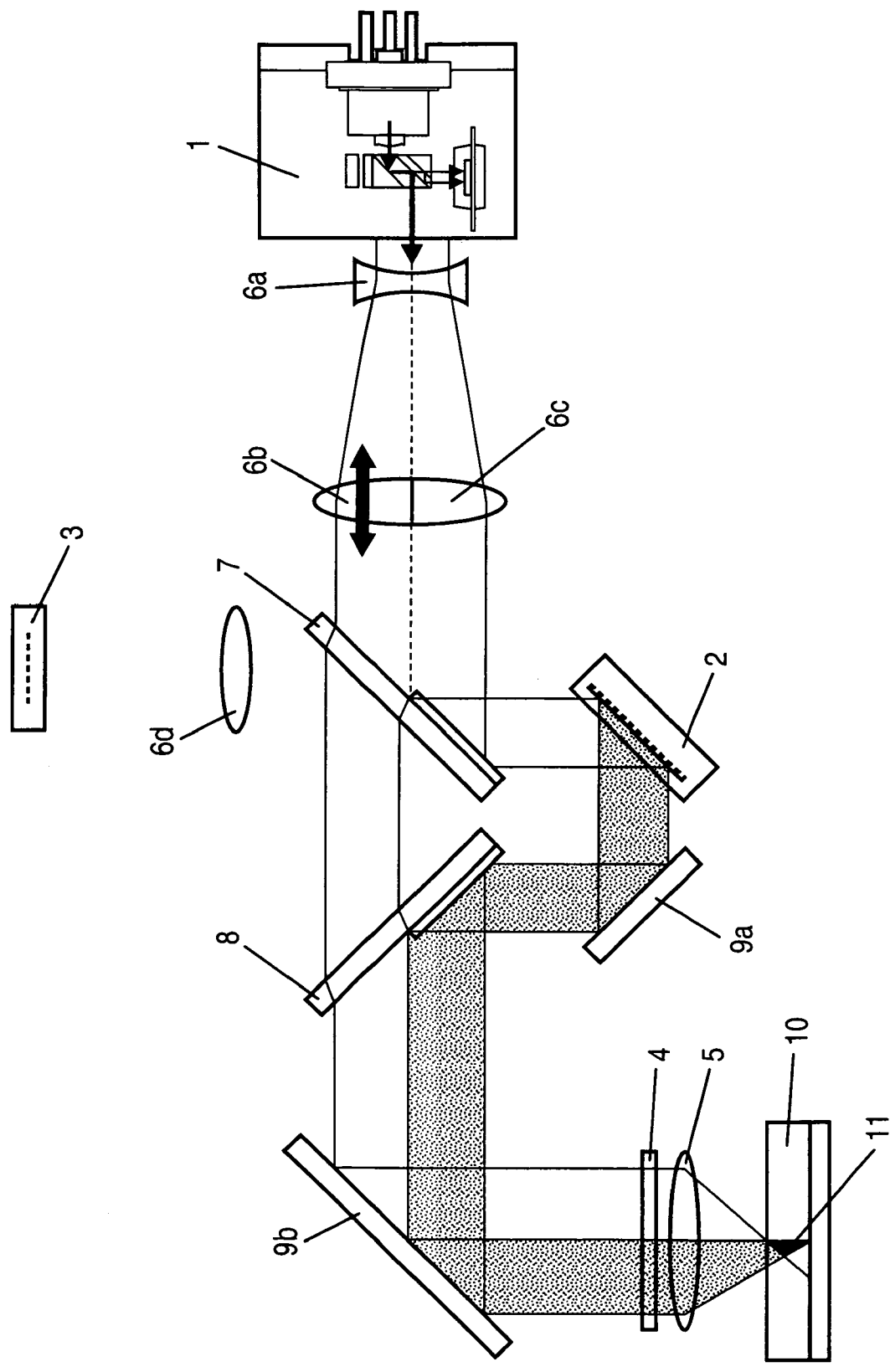
FIG. 2 illustrates a holographic recording process according to the first embodiment.

Referring to FIG. 2, a laser beam emitted from light source 1 is S polarized light. S polarized light is light which has vibrating plane perpendicular to the incident plane. Lens 6a widens the size of the emitted laser beam. Lenses 6b and 6c change the laser beam into parallel light.

Thus, since lenses 6a, 6b and 6c modify the spot size of the laser beam, the spot size can be adjusted to one being suited for a given optical system.

When lens 6b moves along the optical axis of the incident laser beam, the spot size of the laser beam changes on objective lens 5. Objective lens 5 changes a focus position of the laser beam along the thickness direction of recording medium 10.

Therefore, since movement of lens 6b along the optical axis adjusts the focus position of reference light focused on recording medium 10, a multiple-focus type holographic recording process can be performed.

The laser light penetrating lens 6b is used as reference light. The laser light penetrating lens 6c is used as information light.

Accordingly, both the reference light and the information light can be generated with a single laser beam emitted from laser source 1.

The information light penetrates lens 6c, being reflected by the reflection film provided with PBS 7, and reaching SLM 2.

When the information light reaches SLM 2, SLM 2 reflects the information light and adds the recording data for the holographic recording process to the information light. The information light with the recording data is reflected by the reflection film provided with mirror 9a and penetrating glass 8, and travels towards recording medium 10.

Accordingly, it is simultaneously performed both to reflect the information light and to add the recording data to the information light in order to generate the information light with the recording data.

Thereafter, the information light penetrates QWP 4. QWP 4 transforms the polarization of the information light from S polarized light to circular light. Objective lens 5 focuses the information light on a basal plane of recording medium 10.

On the other hand, the reference light penetrates PBS 7, and penetrates glass 8, and reaches mirror 9b. Mirror 9b reflects the reference light. When the reflected reference light penetrates QWP 4, QWP 4 transforms the polarization of the reference light from S polarized light to circular light. Objective lens 5 focuses the reference light on recording medium 10.

The information light and the reference light focused by objective lens 5 interfere with each other. The interference is recorded as interference pattern 11 in recording medium 10.

Figure 3A:
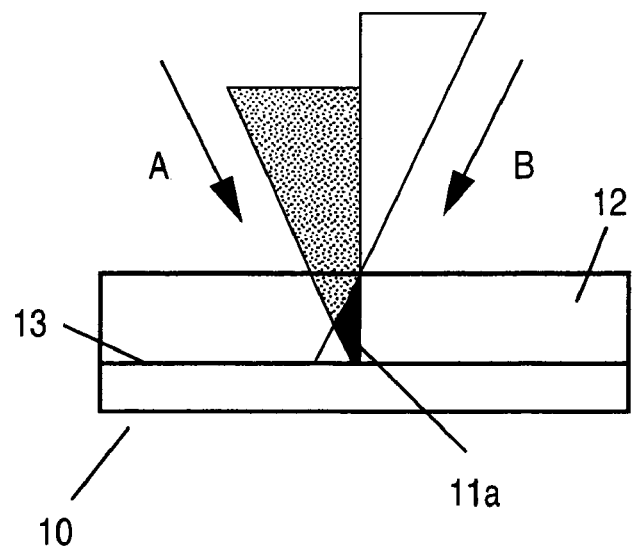
FIG. 3A is an explanatory diagram of the holographic recording process according to the first embodiment.
Figure 3B:
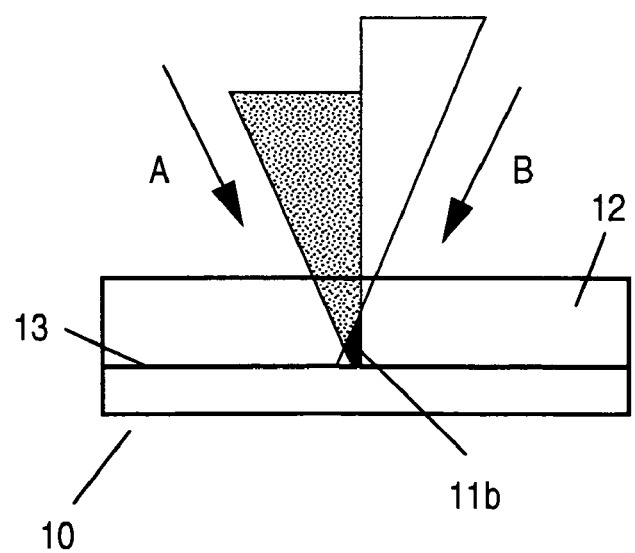
FIG. 3B is an explanatory diagram of the holographic recording process according to the first embodiment.

Referring to FIGS. 3A and 3B, recording medium 10 includes recording layer 12. Reflecting layer 13 is disposed at the basal plane of recording layer 12 to reflect an incident laser beam. In the figure, "A" indicates the information light, and "B" indicates the reference light.

Also, alternatively, protecting layer may be provided on the surface of recording layer 12 instead of having the structure of the above-mentioned recording medium 10.

Interference pattern 11a shows the interference area generated by information light A. Interference pattern 11b shows the interference area generated by reference light B. These interference areas are different because the focus position of reference light B shown in FIG. 3A is different from that of reference light B shown in FIG. 3B. Therefore, when the focus position of reference light B moves, the interference pattern changes.

Accordingly, when the focus position of reference light changes, the interference area is changed and further multiple recording is performed.

As mentioned above, in the holographic recording process, the focus position of the reference light changes according to a position of lens 6b. The focus position change makes both the focus position of the information light, which is focused on recording medium 10 by objective lens 5, and the focus position of the reference light, which is focused on recording medium 10, change relative to each other. As a result, an interference pattern changes by focus positions of the information light and the reference light. Accordingly, a multiple-focus type holographic recording process can be performed by changing the position of lens 6b.

Also, because a multiple recording process can be performed by only lens 6b provided at a light path of the reference light, the holographic recording apparatus can be downsized without extra space for multiple recording.

Further, because the information light and the reference light share a light path until these lights are separated by PBS 7, the number of components can be reduced. Accordingly, downsized holographic recording apparatus can be easily realized.

Now, the reproducing process of the information light, which is recorded in the recording medium, will be described with reference to FIGS. 4 and 5.

Figure 4:
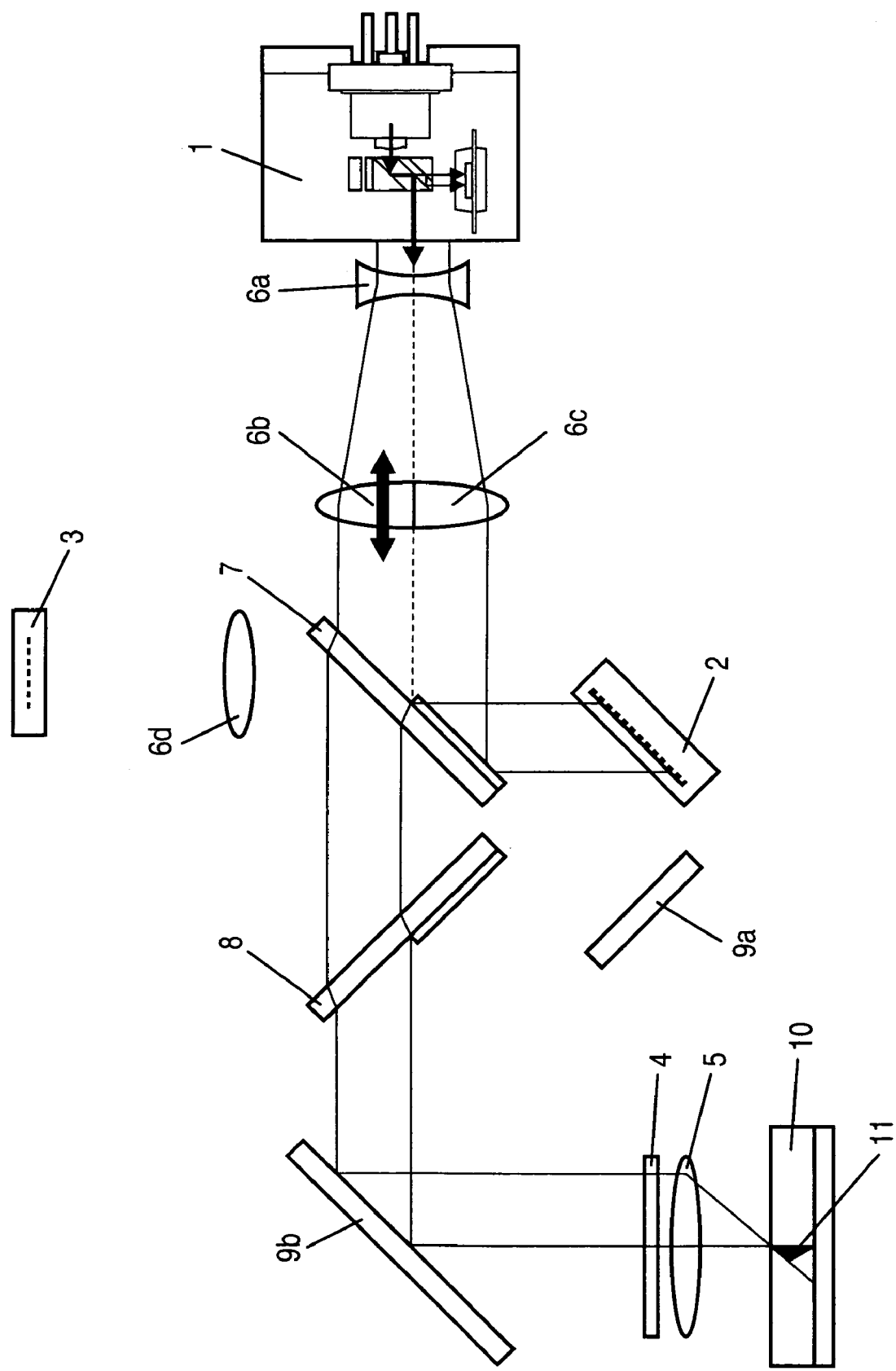
FIG. 4 illustrates an outward light path of holographic reproducing according to the first embodiment.

Referring to FIG. 4, light source 1 emits a laser beam which is characterized by S polarized light. Lens 6a magnifies the laser beam and changes the magnified laser from radiating light into parallel light.

Thus, since the spot size of the laser beam is changeable by lenses 6a, 6b and 6c, the spot size can be adjusted to a size required by optical system.

Lens 6b is movable on the light axis of the laser beam. The spot size of the incident laser beam changes according to the motion of lens 6b. Objective lens 5 changes the focus position of the laser focused in recording medium 10 in the direction of thickness of recording medium 10.

The laser beam penetrating lens 6b is used as reference light. The reflection film provided with PBS 7 reflects the light that penetrates through lens 6c. Although the light reflected by PBS 7 reaches SLM 2, SLM 2 blocks transmission of the laser beam. Therefore, the light reflected by PBS 7 does not reach recording medium 10.

On the other hand, after the reference light penetrates lens 6b, the reference light penetrates both PBS 7 and penetrating glass 8. Mirror 9b reflects the reference light. QWP 4 converts the reflected reference light from S polarized light into circular light. Then, objective lens 5 focuses the converted reference light in recording medium 10.

Figure 5:
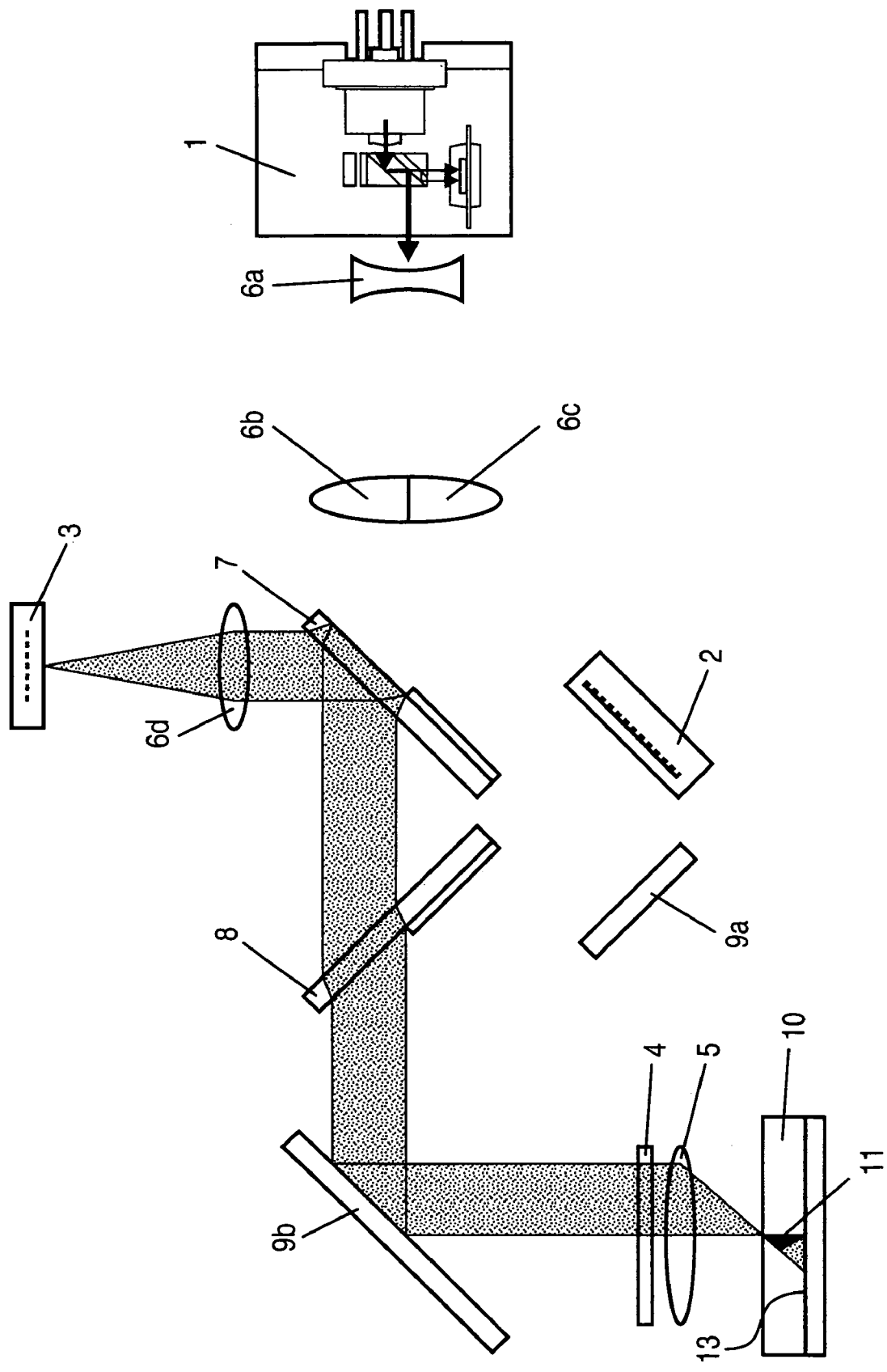
FIG. 5 illustrates a homeward light path of holographic reproducing according to the first embodiment.

Referring to FIG. 5, reflecting layer 13 provided in recording medium 10 reflects the reference light. During reflecting the reference light, reproducing light is generated with the interference pattern provided in recording layer 12. The reproducing light is the information light of the recording process. The generated reproducing light reaches QWP 4 through objective lens 5.

The reproducing light reflected in recording medium 10 is circular light. QWP 4 converts the reproducing light into P polarized light which is parallel with the incident surface of QWP 4.

The reproducing light converted into P polarized light penetrates through both mirror 9b and penetrating glass 8. PBS 7 reflects the reproducing light. Lens 6d condenses the reflected reproducing light to CCD camera 3. CCD camera 3 reads out data form the reproducing light.

Thus, because only P polarized light reaches recording medium 10, even if both the reference light and the reproducing light travel on the identical light path, the quality of the reproducing light can be maintained. Also, since the optical parts of the holographic recording apparatus are disposed on one side of recording medium 10, it is easy to downsize the holographic recording apparatus.

As mentioned above, in the holographic reproducing process, since lens 6 changes the focus position of the reference light, the holographic recording apparatus can reproduce the holographic recording data recorded in multiple mode. Also, when reflecting layer 13, which is provided at the basal plane of recording layer 12 in recording medium 10, reflects the reproducing light, the reproducing light is reflected in the same direction as the reference light, and reaches CCD camera 3. Therefore, since the optical parts of the holographic recording apparatus are disposed on one side of the recording medium, it is easy to downsize the holographic recording apparatus.

Further, since the information light and the reference light share a light path until these lights are separated by PBS 7, the number of components can be reduced. Accordingly, a downsized holographic recording apparatus can be realized.

Moreover, since PBS 7 not only penetrates the reference light but also reflects the reproducing light, the number of components can be reduced. Accordingly, a downsized holographic recording apparatus can be realized.

This embodiment is not limited the structure of the foregoing description. For example, a transmissive type SLM may be used, and PBS 7 may be used without using mirror 9. Also, the invention is capable of change or modification, within the scope of the inventive concept, as expressed herein.

Instead of CCD camera, a CMOS camera may be used as an example of the reproducing unit. Any type of camera capable of reading out data from the information light may be used.

Further, in the first embodiment, PBS 7 is shaped like a plate. However, PBS 7 may be shaped in other shapes such as a rectangular parallelepiped.

Further, by rearranging its position relative to QWP 4, objective lens 5 and recording medium 10, PBS 7 may be used without the need for penetrating glass 8 and mirror 9.

Further, in the first embodiment, light source 1 emits a laser beam of S polarized light. However, a laser beam of P polarized light may be used as light source 1.

Further, in the first embodiment, a focus changing lens is used as an example of the focus position controller. The focus changing lens can arbitrarily change the focus position, and is like a liquid crystal lens the focus position of which is changed according to an applied voltage. Accordingly, since space to move lens 6b in order to change the focus position becomes unnecessary, holographic recording apparatus can be downsized.

Further, if the above-mentioned liquid crystal lens is used, lenses 6b and 6c can be unified.

Second Embodiment

The second embodiment shows the main structure of an optical head in the holographic recording apparatus, which uses the focus position controller after dispersing light emitted from the light source. Also, drawings of the second embodiment use identical reference numbers to common elements of the first and second embodiments, and the description of the like elements of the first embodiment applies to the second embodiment.

Figure 6:
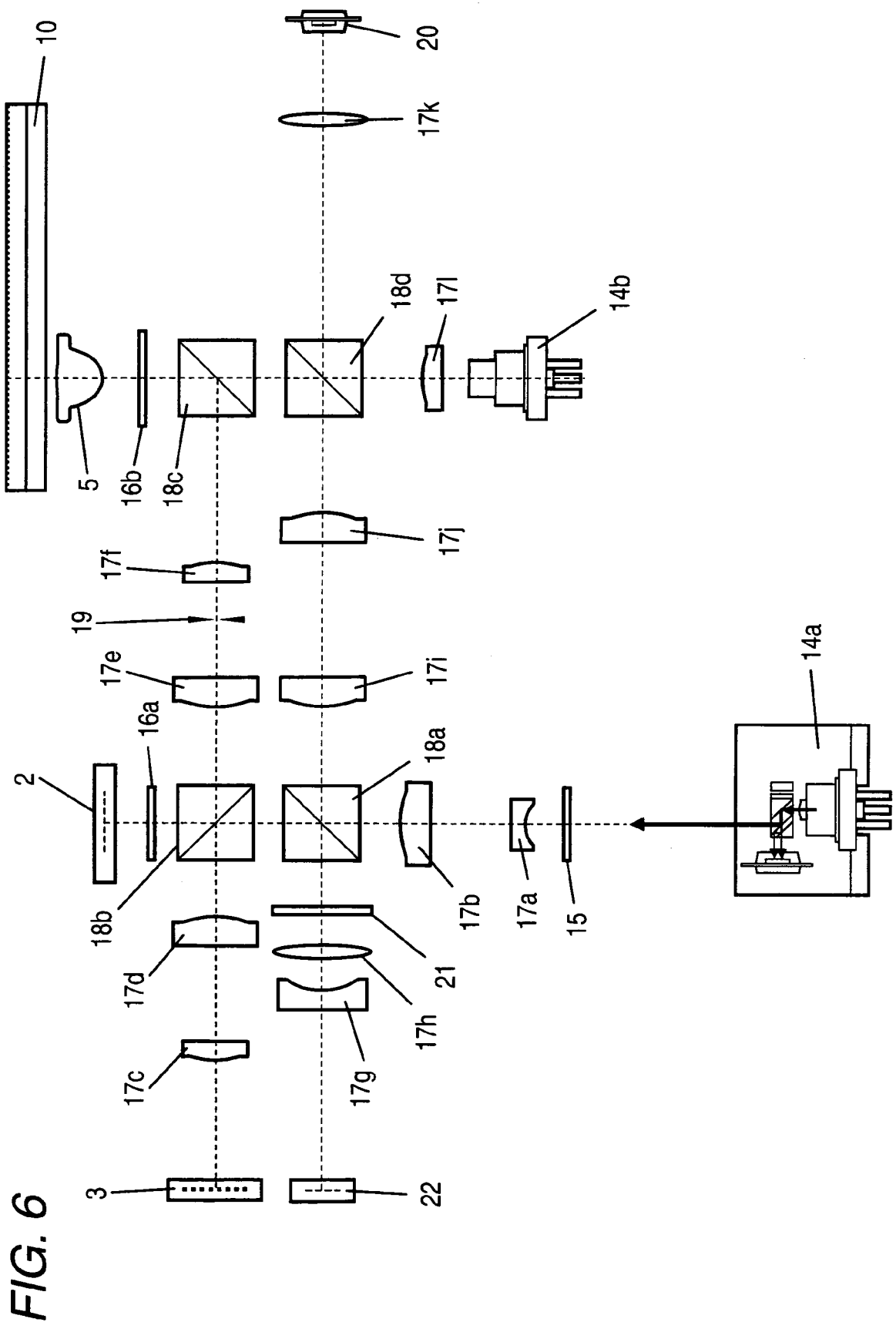
FIG. 6 illustrates a configuration of a holographic recording and reproducing apparatus according to a second embodiment.

Referring to FIG. 6, the holographic recording/reproducing apparatus has SLM 2, CCD camera 3, objective lens 5, light sources 14a and 14b, liquid crystal half-wavelength plate 15, quarter-wavelength plate 16a and 16b, lenses 17a-17k, polarized beam splitters 18a, 18b, 18c and 18d, pinhole 19, light intensity monitor 20, diffractive optical element 21, Photo Detector IC (referred to as "PDIC," hereinafter) 22. In the holographic recording/reproducing apparatus, recording medium 10 is disposed at a reproducing and recording position. Each of light sources 14a and 14b emit a laser beam. Spatial light modulator 2 is reflective type, having a plurality of image elements disposed in grid shape and having a function to add the recording data to an incident laser beam. Liquid crystal half-wavelength plate 15 changes the orthogonal phase difference between linear polarizations into an angle of 180 degrees, and can be shifted between ON state and OFF state for changing the phase difference. Liquid crystal half-wavelength plate 15 is referred to as "L.C.HWP" hereinafter. Quarter wavelength plate 16 changes the phase difference of an incident laser beam into an angle of 90 degrees, and is referred to as "QWP" hereinafter. Polarized beam splitters 18a-18d are an example of the dispersing unit for changing both transmissivity and reflectivity by polarization of a laser beam having a specific wavelength. Each of the polarized beam splitters is referred to as "PBS" hereinafter. Pinhole 19 is an example of a blocking unit disposed between lens 17e and lens 17f. Light intensity monitor 20 detects light intensity of the laser beam. Diffractive optical element 21 disperses the incident laser beam. PDIC 22 detects a plurality of laser beams.

Light sources have light source 14a and light source 14b. Light source 14a emits a laser beam, which is S polarized light of wavelength λ1. Light source 14b emits a laser beam, which is S polarized light of wavelength λ2.

PBSs 18a and 18b reflect S polarized light of wavelength λ1, but P polarized light of wavelength λ1 penetrates both PBSs 18a and 18b. Each of PBSs 18c and 18d has predetermined values of transmissivity and reflectivity. In this embodiment, PBS 18c has, relative to both S and P polarized lights, 50% of transmissivity and 50% of reflectivity. PBS 18d has, relative to S polarized light, 10% of transmissivity and 90% of reflectivity.

In this embodiment, P polarized light of wavelength λ2 penetrates or passes through PBS 18a. Both P and S polarized lights of wavelength λ2 penetrate PBS 18c. PBS 18d has, to S polarized light, 90% of transmissivity and 10% of reflectivity and reflects P polarized light.

Since both transmissivity and reflectivity depend on the optical system, they are not limited to the above-mentioned values and may be arbitrarily determined.

The recording process will be described now with reference to FIG. 7.

Figure 7:
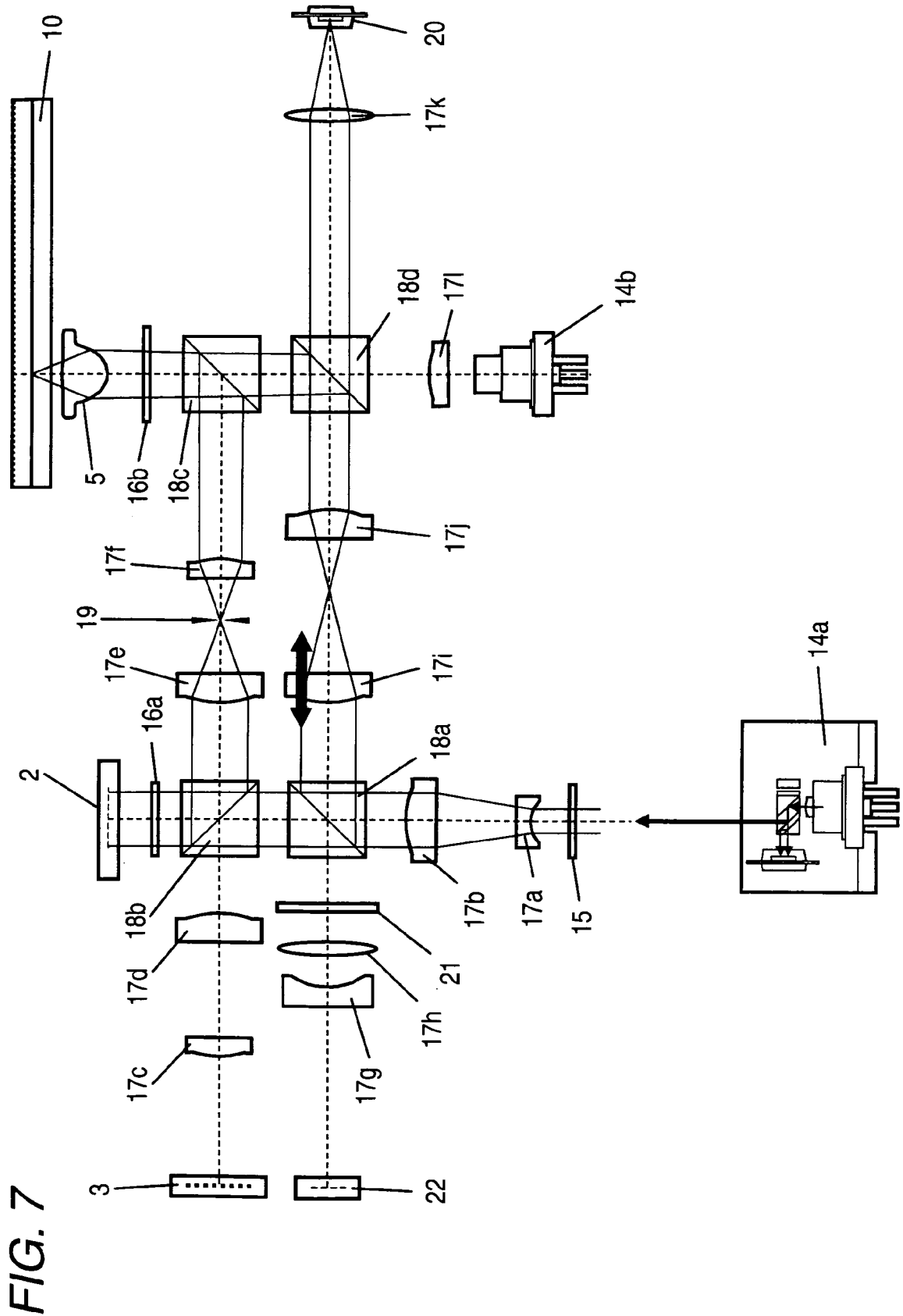
FIG. 7 illustrates a holographic recording process according to the second embodiment.

Referring to FIG. 7, laser beam emitted from light source 14a has wavelength λ1. If L.C.HWP 15 is in the ON state and the laser beam penetrates L.C.HWP 15, L.C.HWP 15 converts the polarization component of the laser beam into S polarization component: 50% and P polarization component: 50%.

Since both transmissivity and reflectivity depends on the optical system, they are not limited to the above-mentioned values and may be arbitrarily determined.

Lenses 17a and 17b diffuse the converted laser beam. When the converted laser beam reaches PBS 18a, the S polarization component of the laser beam is reflected, but the P polarization component of the laser beam penetrates PBS 18a. As a result, a light path is split into two directions for S and P polarized lights. S polarized light is used for the reference light and P polarized light is used for the information light.

Thus, PBS 18a can split the laser beam, the polarization component of which is converted into S and P polarization components, into two different directions.

After PBSs 18a and 18b pass the information light of P polarized light, the information light reaches SLM 2 through QWP 16a. When the information light penetrates QWP 16a, the information light is converted from P polarized light to circular polarized light.

When SLM 2 reflects the information light of circular polarized light, SLM 2 adds the recording data to the information light. After reflecting, QWP 16a converts again the information light from circular polarized light into S polarized light.

Thus, while SLM 2 reflects the information light, the recording data is added to the information light, and the information light with the holographic recording data can be generated.

After being converted into S polarized light, the information light with the recording data is reflected by PBS 18b. Lenses 17e and 17f focus or diffuse the information light. Pinhole 19 is disposed between lenses 17e and 17f. Even if unnecessary light is generated by diffraction, since the unnecessary light is not focused at pinhole 19, only the information light passes through pinhole 19.

Thus, since pinhole 19 is disposed at the focus position of the information light focused by lens 17e, pinhole 19 blocks the unnecessary light, the focus position of which is different from that of the information light. Accordingly, only the information light with the recording data travels on a light path. Consequently, the holographic recording process can be accurately performed.

Thereafter, PBS 18c reflects 50% of the information light of S polarized light, and the information light travels toward recording medium 10.

On the other hand, after being reflected by PBS 18a, the reference light is focused or diffused by lenses 17i and 17j. Lens 17i is movable on an optical axis of the reference light. When the reference light reached PBS 18d, the spot size of the reference light is changed according to a position of lens 17i.

After 10% of the reference light penetrates or passes through PBS 18d, lens 17k focuses the penetrating reference light. Light intensity monitor 20 detects light intensity from the reference light. Light intensity of light source 14a is adjusted according to the detected light intensity. After PBS 18d reflects 50% of the reference light, the reference light travels toward recording medium 10.

Both the information light and the reference light travel along the identical light path to reach recording medium 10. The laser beam converges in a manner that a focus position of the reference light is closer to an incidence plane of recording medium 10 than that of the information light.

QWP 16b converts both the information and reference lights from S polarized light to circular light. Objective lens 5 focuses both the information and reference lights in recording medium 10.

Servo control, which controls a position of recording medium 10 during the holographic recording process, will now be described with reference to FIG. 8.

Figure 8:
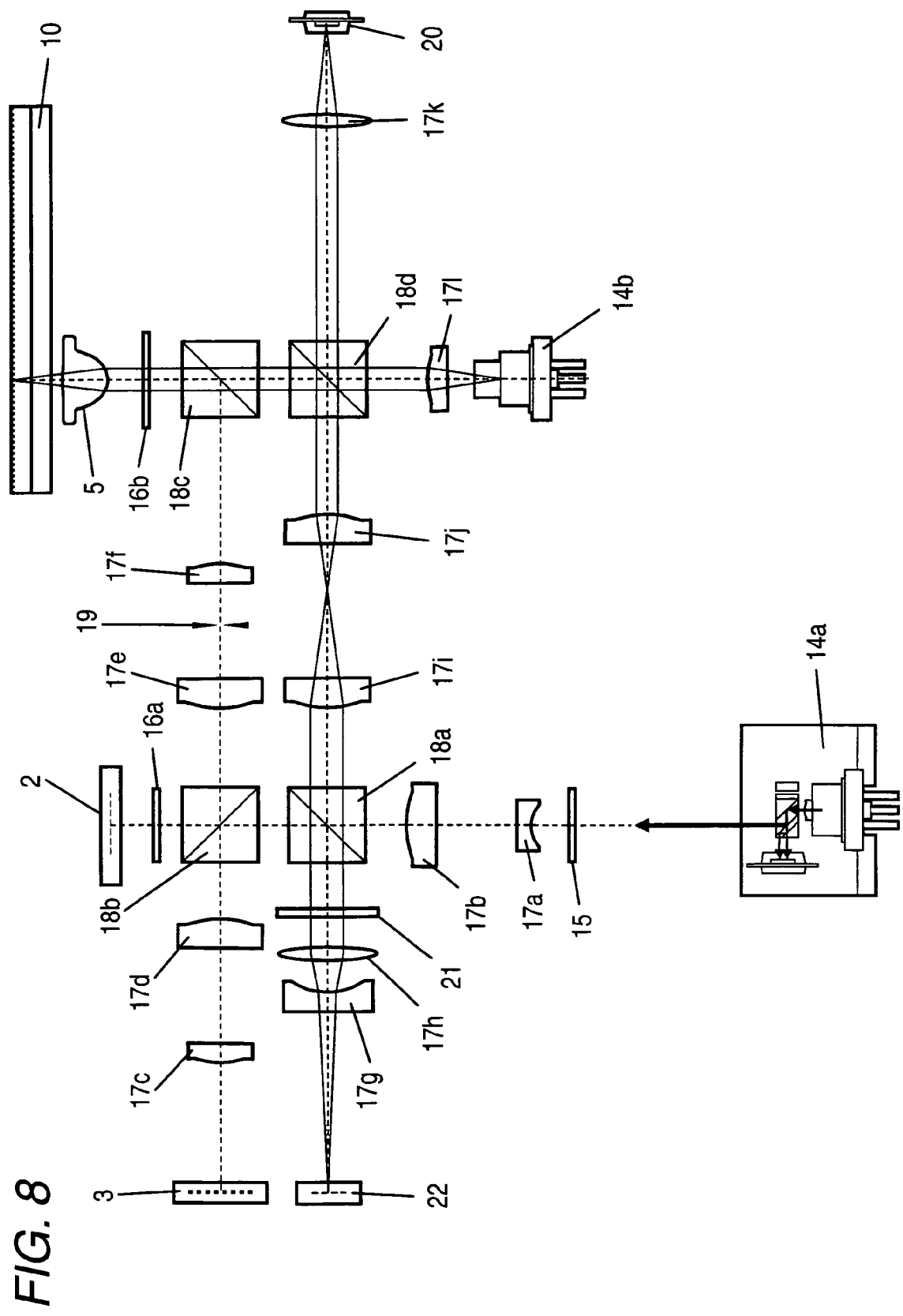
FIG. 8 illustrates a servo control according to the second embodiment.

Referring to FIG. 8, light source 14b emits a laser beam, which is S polarized light of wavelength λ2. After the laser beam penetrates lens 17l, PBS 18d reflects 10% of the laser beam. The reflected laser beam travels toward light intensity monitor 20 through lens 17k. Light intensity monitor 20 detects light intensity from the laser beam. Light intensity of light source 14b is adjusted according to the detected light intensity.

On the other hand, the laser beam penetrating PBS 18d penetrates PBS 18c. QWP 16b converts the laser beam into circular light. Objective lens 5 focuses the laser beam on the basal plane of recording medium 10.

QWP 16b converts the reflected laser beam into P polarized light. After the converted laser beam penetrates PBS 18c, PBS 18d reflects 90% of the laser beam. Lenses 17j and 17i focus or diffuse the reflected laser beam. The laser beam travels toward diffractive optical element 21 through PBS 18a.

Then, diffractive optical element 21 splits the incident laser beam into a plurality of laser beams. Lenses 17h and 17g focus the plurality of laser beams into PDIC 22.

Various types of servo controls are performed using the laser beam detected by PDIC 22.

Thus, light intensity monitor 20 detects the light reflected by recording medium 10, and a position of recording medium 10 can be modified using the detected light.

Interference of the laser beam will now be described with reference to FIGS. 9A and 9B.

Guide groove 23 is disposed on the basal plane of recording medium 10 in order to control an access position. FIG. 9A shows a status in which the focus position of the reference light B is on the surface of recording layer 12. FIG. 9B shows a status in which the focus position of the reference light B is within recording layer 12.

The interference area of this embodiment, where recording medium 10 reflects both the information light and the reference light, is the same as that of the first embodiment.

Further, recording medium 10 may have a protective film on the recording layer.

Figure 9A:
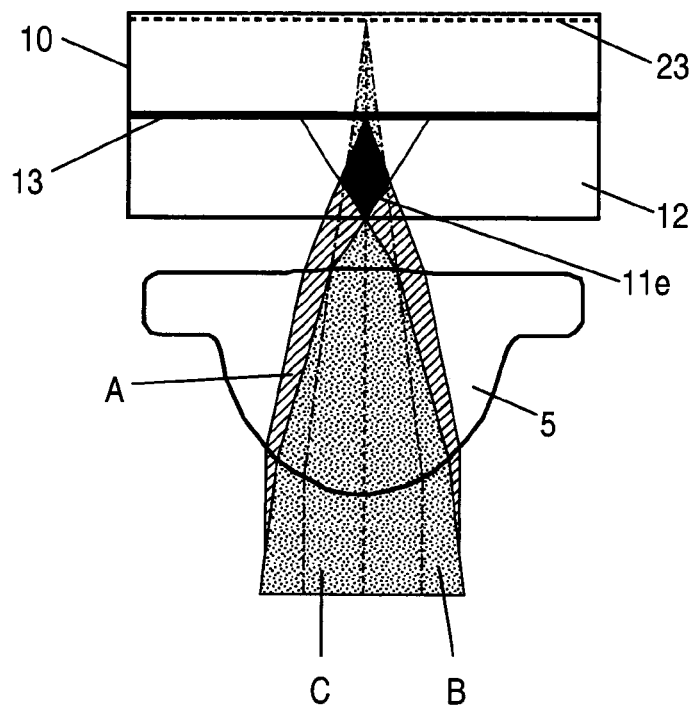
FIG. 9A is an explanatory diagram of a holographic recording process according to the second embodiment.
Figure 9B:
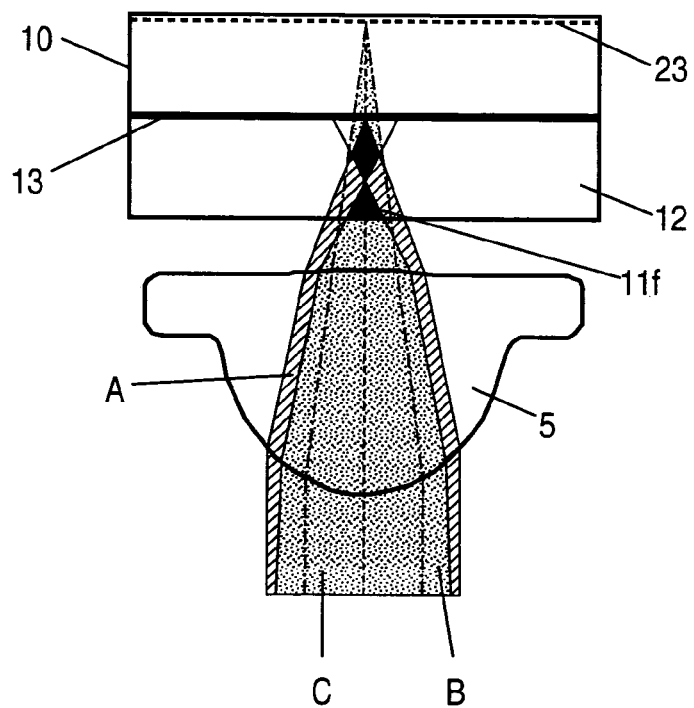
FIG. 9B is an explanatory diagram of a holographic recording process according to the second embodiment.

Referring to FIGS. 9A and 9B, the focus position of the information light A is fixed at reflecting layer 13 provided on the basal plane of recording layer 12. However, since the focus position of the information light B is not fixed, interference patterns 11e and 11f of both the information light and the reference light are different. That is because the focus position changes according to the spot size of the reference light traveling toward objective lens if the position of lens 17i is moved.

Thus, since the focus position of the reference light in recording medium 10 changes according to the motion of lens 17i along the optical axis, the multiple-focus type holographic recording process can be performed.

Further, by changing the focus position of the reference light, the interference area of the information light and the reference light changes, and multiple recording can be performed.

Further, the laser beam of wavelength λ2 emitted from light source 14b penetrates through reflecting layer 13, which reflects the laser beam of wavelength λ1. Guide groove 23 provided at or near the basal plane of recording medium 10 is read out with the laser beam of wavelength λ2. The servo control is performed with this reflection light.

Thus, in the holographic recording process, the focus position of the reference light changes according to the position of lens 17i. The focus position change makes both the focus position of the information light, which is focused on recording medium by objective lens 5, and the focus position of the reference light, which is focused on recording medium, change relative to each other. As a result, an interference pattern changes by the focus positions of the information light and the reference light. Accordingly, a multiple-focus type holographic recording process can be performed by changing the focus position of the reference light.

Also, since multiple recording can be performed by only lens 17i provided at the light path of the reference light, the holographic recording apparatus can be downsized without extra space for multiple recording.

Further, since the paths of both the information light and the reference light are parallel, the holographic recording apparatus can be downsized without extra space for multiple recording.

Thus, since a plurality of lenses modify the spot size of the laser beam, the spot size can be adjusted to one suited for a given optical system.

The process for reproducing the information light recorded in recording medium will now be described with reference to FIGS. 10 and 11.

Figure 10:
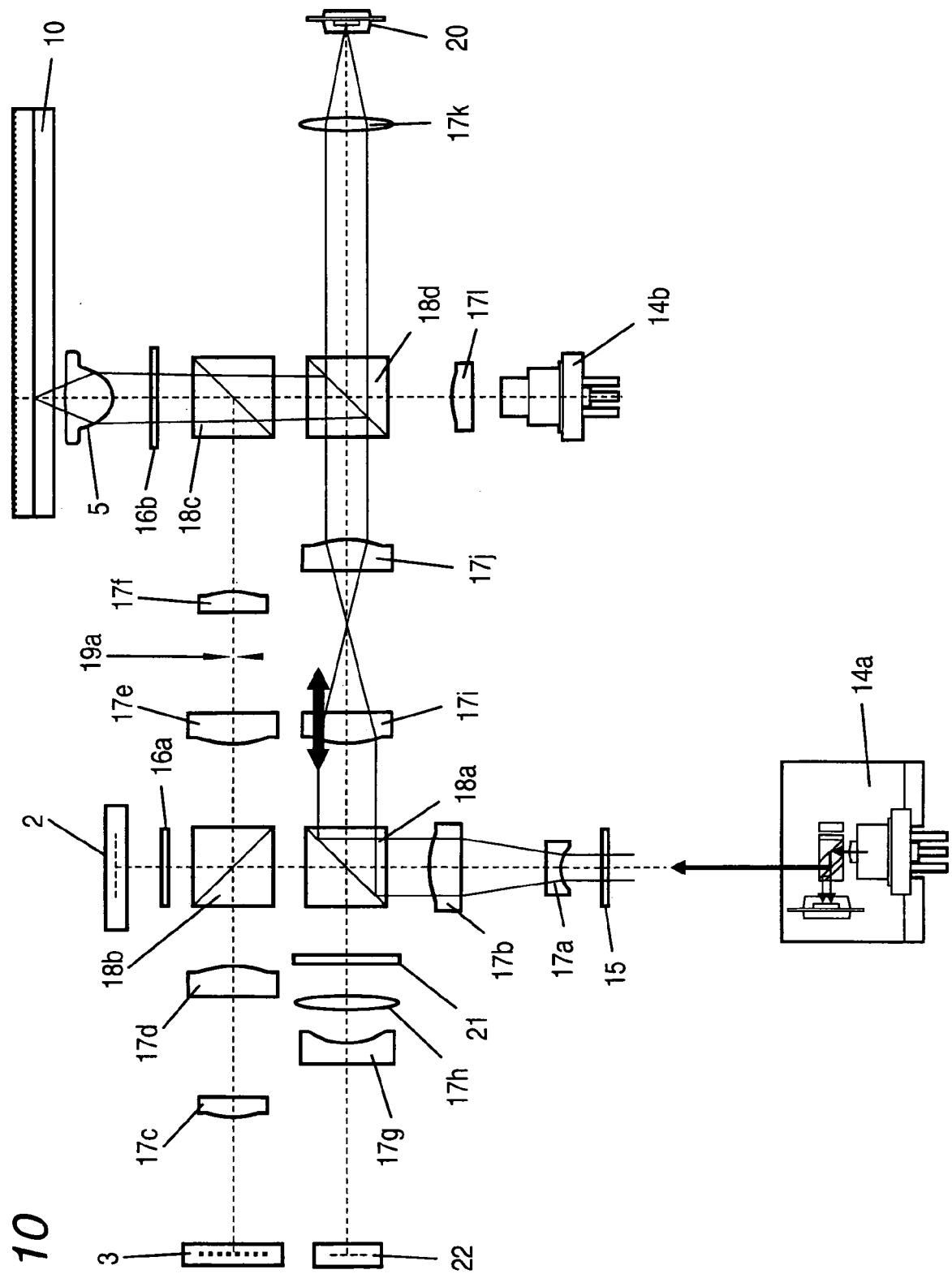
FIG. 10 illustrates an outward light path of holographic reproducing according to the second embodiment.

Referring to FIG. 10, light source 14a emits a laser beam of S polarized light. Since the laser beam penetrates L.C.HWP15 with the state OFF, the laser beam is still S polarized light. The reference light of the recording process travels toward recording medium 10 along the light path.

Thus, since incident laser beam is used as the reference light, the read-out process can be readily performed.

Then, QWP 16 converts the laser beam into circular light. After the laser beam penetrates QWP 16, objective lens 15 focuses the laser beam. When reflecting layer 13 reflects the laser beam, the information light is generated with the interference pattern provided in recording layer 12. Namely, the information light is generated as the reproducing light.

Figure 11:
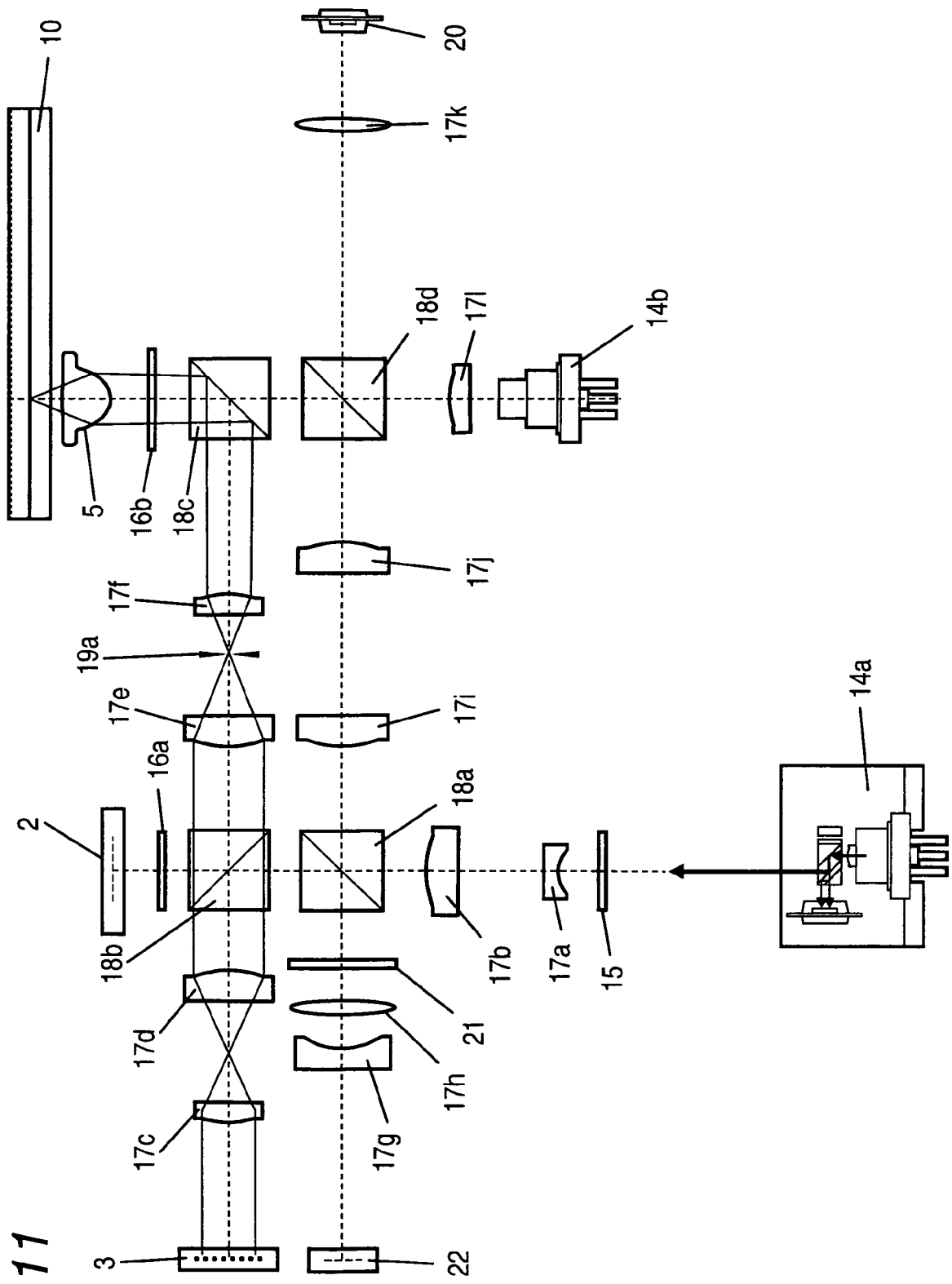
FIG. 11 illustrates a homeward light path of holographic reproducing according to the second embodiment.

Referring to FIG. 11, when the reproducing light penetrates QWP 16b, QWP 16b converts the reproducing light from circular light to P polarized light. PBS 18c reflects 50% of the reproducing light. Since pinhole 19 blocks the reproducing light emitted from other reference surface provided in recording layer 12, the only necessary reproducing light travels toward PBS 18b.

Thus, pinhole 19, which is provided at a focus position of the reproducing light focused by lens 17f, blocks the reproducing light which is emitted from the other reference surface and different from the necessary reproducing light. As a result, the quality of the reproducing process can be improved.

The reproducing light penetrates PBS 18b, and travels toward CCD camera 3. While traveling, the reproducing light is focused or diffused by lenses 17c and 17d.

Then, CCD camera 3 reads out the information from the reproducing light traveling toward CCD camera 3.

As mentioned above, in the holographic reproducing process, since lens 17i changes the focus position of the reference light, the holographic recording apparatus can reproduce holographic recording data multiply recorded. Also, when reflecting layer 13, which is provided at the basal plane of recording layer 12 in recording medium 10, reflects the reproducing light, the reproducing light is reflected in the same direction as the reference light, and reaches CCD camera 3. Therefore, since optical parts of the holographic recording apparatus are disposed on one side of the recording medium, the holographic recording apparatus may be downsized.

Further, since a plurality of lenses modify the spot size of the laser beam, the spot size can be adjusted to one being suited for a given optical system.

Further, since the information light and the reference light share the identical light path in a manner that the information light at the recording process is used as the reproducing light at the reproducing process, the number of components can be reduced. Accordingly, a downsized holographic recording apparatus can be realized.

Further, the servo control is performed not only at the reproducing process but also at the recording process.

Further, the optical system of the second embodiment is not limited to the foregoing description. For example, a transmissive type SLM may be used, and the shape of the PBSs may be changed. Also, liquid crystal lenses may be used. The invention is capable of change or modification, within the scope of the inventive concept, as expressed herein.

Further, at least the servo control and light intensity control may be applied to the first embodiment

Third Embodiment

The third embodiment relates to a holographic recording/reproducing apparatus which is compatible with formats of CD (Compact Disk), DVD (Digital Versatile Disc) and Blu-ray (referred to as "BD," hereinafter). In the holographic recording/reproducing apparatus, the hologram and DVD share a light source, and the servo control and CD share a light source. Also, the drawings of the third embodiment use identical reference characters for common elements of the first, second and third embodiments, and the descriptions of such common elements in the first and second embodiments also apply to the third embodiment.

Figure 12:
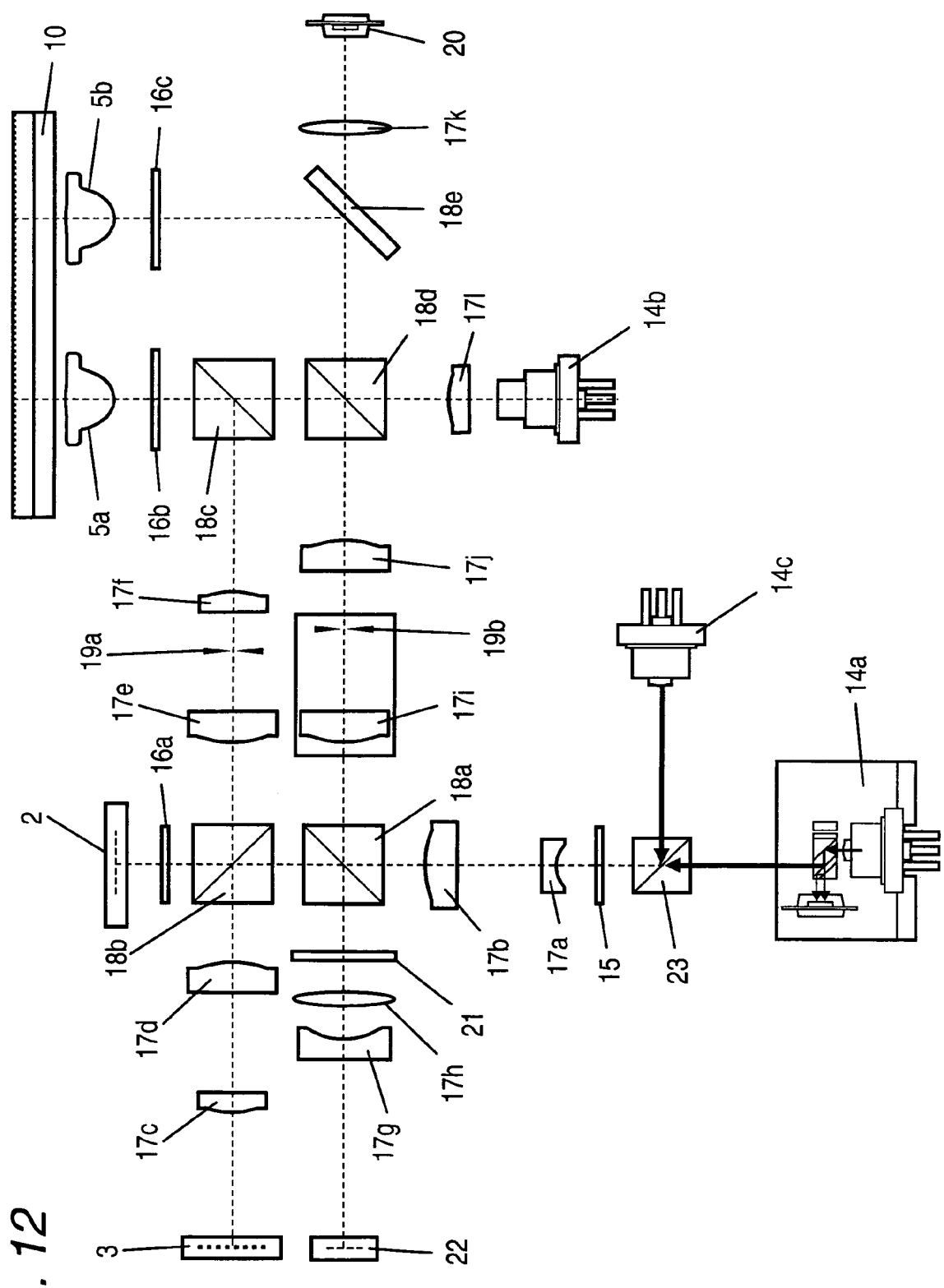
FIG. 12 illustrates a configuration of a holographic recording and reproducing apparatus according to a third embodiment.

Referring to FIG. 12, the holographic recording/reproducing apparatus has first objective lens 5*a*, second objective lens 5*b*, light source 14*c*, QWP 16*c*, PBS 18*e*, lens 17*e*, pinhole 19*a* and pinhole 19*b*. First objective lens 5*a* is used for hologram, DVD and CD. Second objective lens 5*b* is used for BD. Light source 14*c* emits a laser beam of S polarized light with wavelength λ3. QWP16*c* and PBS 18*e* are disposed over a BD recording medium. Pinhole 19*a* is disposed between lenses 17*e* and 17*f*. Pinhole 19*b* is disposed between lenses 17*i* and 17*j*, and is movable in synchronization with lens 17*i*.

Wavelength λ1 of light source 14*a* is 650 nm in order to record and reproduce a hologram and to record and reproduce DVD. Wavelength λ2 of light source 14*b* is 780 nm in order to record and reproduce CD and to perform servo control. Wavelength λ3 of light source 14*c* is 405 nm in order to record and reproduce BD. These wavelengths λ1, λ2 and λ3 are not limited to 650 nm, 780 nm and 405 nm.

Recording medium 10 has four types of recording schemes: hologram, BD, DVD and CD. That is, recording medium 10 includes holographic recording medium 10*a*, BD recording medium 10*b*, DVD recording medium 10*c* and CD recording medium 10*d*.

The respective PBSs have predetermined transmissivity and reflectivity. Specifically, PBS 18*a* reflects S polarized light, but P polarized light penetrates PBS 18*a*. Both S polarized light and P polarized light penetrates PBS 18*d*. Both each 10% of S polarized light and P polarized light penetrates PBS 18*e*, but PBS 18*e* reflects each 90% of S polarized light and P polarized light.

Both laser beams of wavelength λ1 and λ2 penetrates PBD 18*e*.

Laser beams of wavelength λ1 penetrate BS 23, but BS 23 reflects the laser beams of wavelength λ3.

Since both transmissivity and reflectivity depend on the optical system, they are not limited to the above-mentioned values and may be arbitrarily determined.

First of all, in the hologram recording and reproducing process, light source 14*a* emits a laser beam of wavelength λ1. The emitted laser beam penetrates BS 23 and travels toward L.C.HWP 15. In the third embodiment, the recording/reproducing process by the holographic recording medium is the same as the process of the second embodiment. Recording and reproducing processes are performed with respect to holographic recording medium 10.

Figure 13:
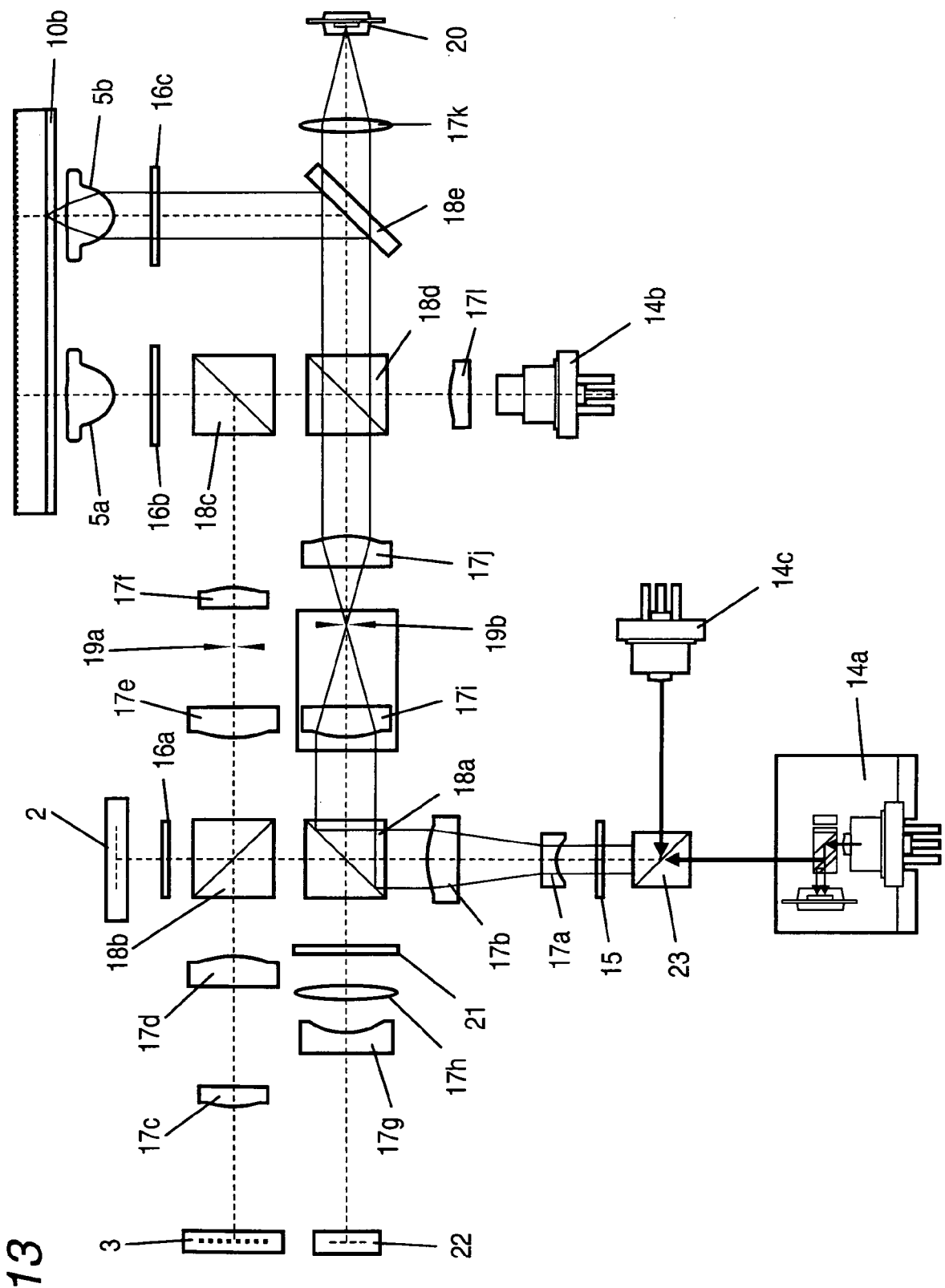
FIG. 13 illustrates a BD recording process according to the third embodiment.
Figure 14:
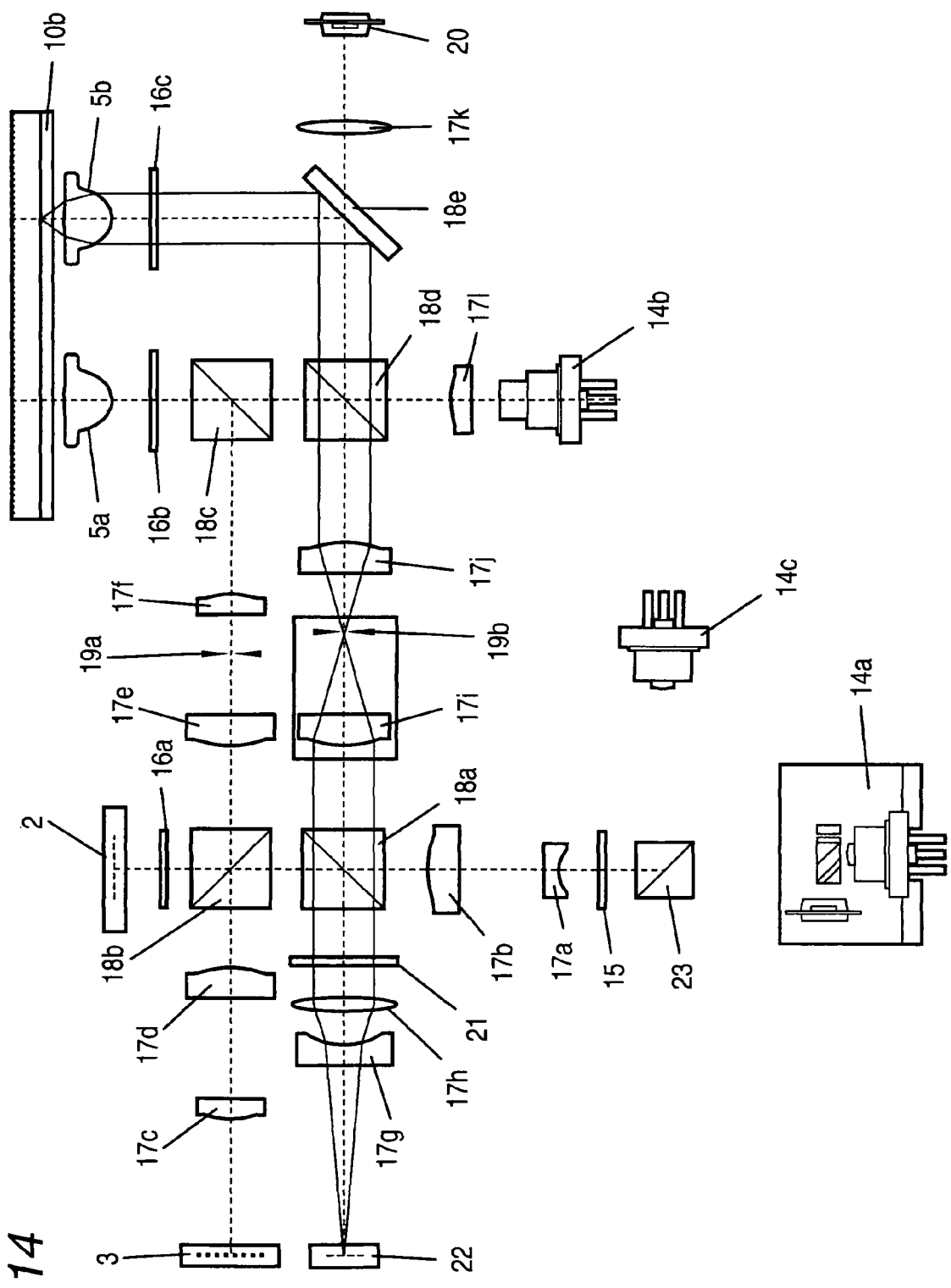
FIG. 14 illustrates a BD reproducing process according to the third embodiment.

Next, the BD recording process will be described relative to FIG. 13.

Light source 14*c* emits a laser beam of S polarized light with wavelength λ3. BS 23 reflects the emitted laser beam and the laser beam reaches L.C.HWP 15.

Since L.C.HWP 15 is in the OFF state, the laser beam of S polarized light penetrates L.C.HWP 15 without changing its polarization.

After penetrating L.C.HWP 15, the laser beam penetrates lenses 17*a*, 17*b*, PBS 18*a* and lenses 17*i* and 17*j* along the light path on which the reference light passes at the holographic recording process.

In this multiple recording process, the focus position is decided according to the position of lens 17*i* which is used as the focus position controller at the holographic recording process.

Then, after penetrating PBS 18*d*, the laser beam with wavelength λ3 travels toward PBS 18*e*.

10% of the laser beam penetrates PBS 18*e*, travels toward light intensity monitor 20, and is used for adjusting the light intensity of light source 14*c*. PBS 18*e* reflects 90% of the laser beam, and the laser beam travels toward QWP 16*c*.

QWP 16*c* converts the incident laser beam from S polarized light to P polarized light. Objective lens 5*b* focuses the laser beam in BD recording medium 10*b* in order to record data therein.

Thus, since the BD recording process uses the light path for the reference light of holographic recording and reproducing processes, BD multiple recording can be performed by lens 17*i*. Also, since the light path is shared, a downsized holographic and BD recording apparatus can be realized.

Next, the BD reproducing process will be described. In the reproducing process, light source 14*c* emits the laser beam along the same light path as one used in the recording process. The laser beam travels toward BD recording medium 10*b*. BD recording medium 10*b* reflects the laser beam. Then, the laser beam travels toward QWP 16*c* as the reproducing light.

QWP 16*c* converts the reproducing light from circular light to P polarized light. PBS 18*e* reflects 90% of the reproducing light. The reproducing light penetrates PBS 18*d*. Lenses 17*j* and 17*i* diffuse and focus the reproducing light.

BD recording medium 10*b* has a plurality of layers including a target layer. Unnecessary reproducing light is reproduced from layers other than the target layer. However, since pinhole 19*b* is provided at the focus position of the reproducing light coming from the target layer, pinhole 19*b* blocks the unnecessary reproducing light.

The reproducing light travels toward diffractive optical element 21 through PBS 18*a*. Diffractive optical element 21 splits the reproducing light into a plurality of reproducing lights. These reproducing lights are focused in PDIC 22.

Thus, pinhole 19 blocks the unnecessary reproducing light which is emitted from layers other than the target layer. As a result, since only the reproducing light emitted from the target layer is reproduced, the quality of the reproducing process can be improved.

By the laser beam detected by PDIC 22, various types of servo controls are performed and recording data is reproduced.

Thus, since the BD reproducing process uses the light path for the reference light of the holographic reproducing process, the number of parts can be reduced for the recording apparatus for holographic reproducing and BD reproducing. As a result, a downsized recording apparatus can be realized.

Recording medium 10*b* reflects the laser beam which is recorded in the BD recording process. Since the reflected laser beam travels along the same light path as the one used in the reproducing process, the servo control is performed using data read out by PDIC 22.

Next, the DVD recording process will be described with reference to FIG. 15.

Figure 15:
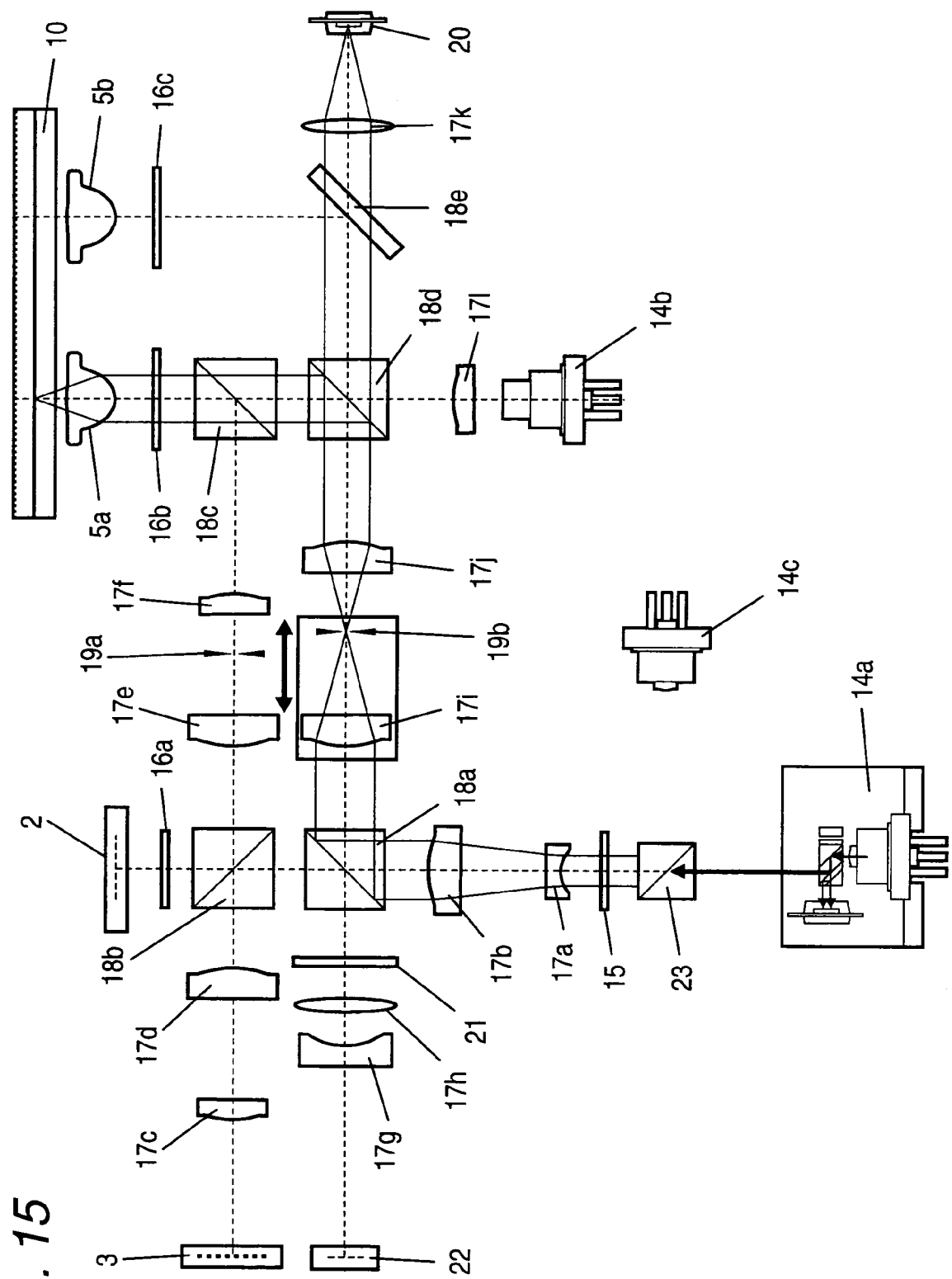
FIG. 15 illustrates a DVD recording process according to the third embodiment.

Referring to FIG. 15, the light path used in the DVD recording process is the same as the one used in the holographic recording process. Lens 17*i* has an example of the focus position controller and switches focus position at the multiple recording process.

Thus, since the DVD recording process uses the light path for the reference light of holographic recording and reproducing processes, the number of parts can be reduced for the recording apparatus for holographic reproducing and BD reproducing. As a result, a downsized recording apparatus can be realized.

Further, since lens 17*i* has a plurality of layers, DVD multiple recording can be performed.

Figure 16:
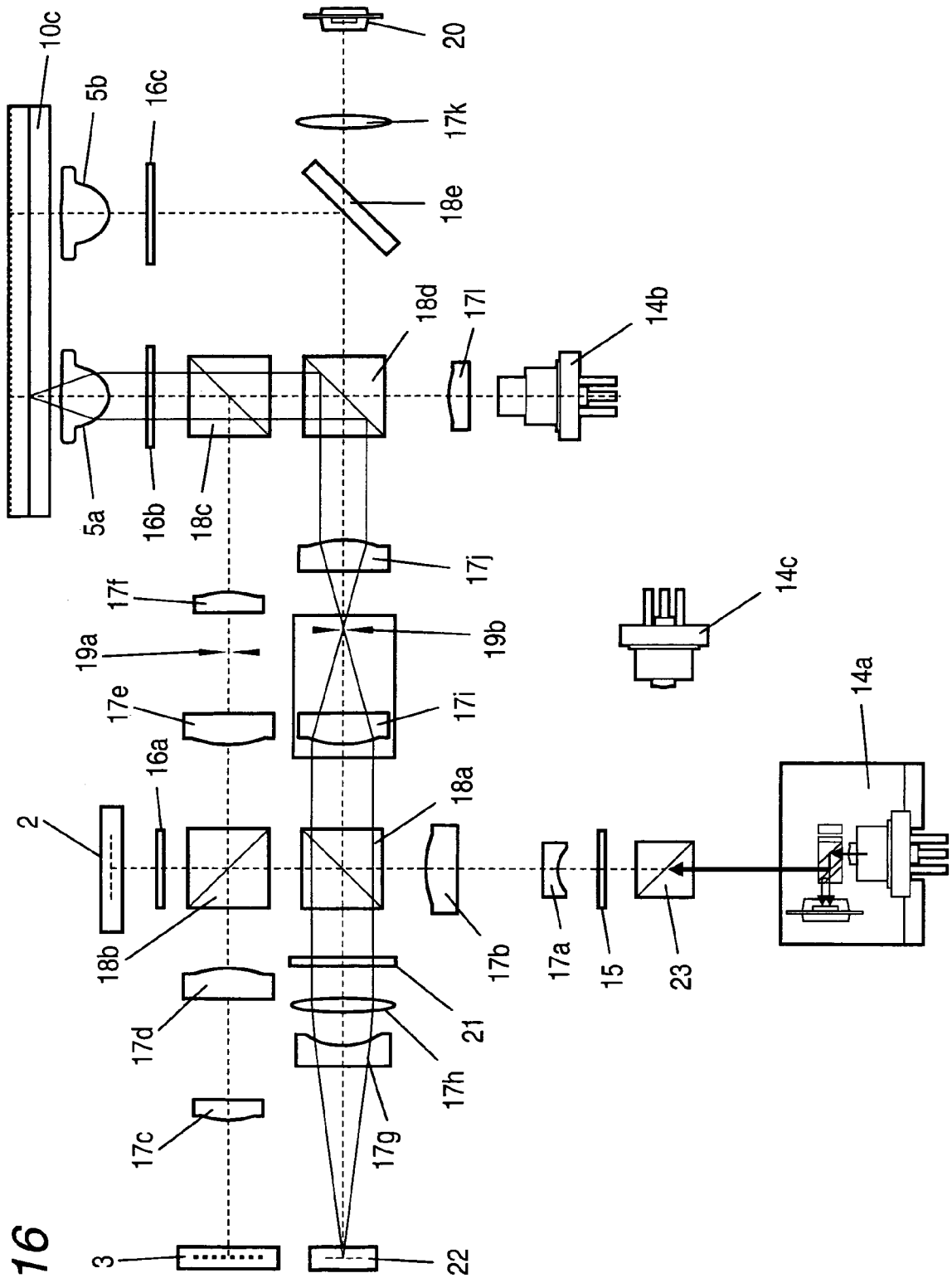
FIG. 16 illustrates a DVD reproducing process according to the third embodiment.

Referring to FIG. 16, in the DVD reproducing process, the laser beam emitted from light source 14a travels toward recording medium 10c along a light path for the reproducing process, as well as the DVD recording process.

QWP 16b converts the reproducing light, which is generated from recording medium 10c, from circular light to P polarized light.

50% of the reproducing light, which is converted into P polarized light, penetrates PBS 18c, and PBS 18d reflects 90% of the reproducing light. Lenses 17j and 17i diffuse and focus the reproducing light.

DVD recording medium 10c has a plurality of layers including a target layer. Unnecessary reproducing light is reproduced from layers other than the target layer. However, since pinhole 19b is provided at the focus position of the reproducing light coming from the target layer, pinhole 19b blocks the unnecessary reproducing light.

The reproducing light travels toward diffractive optical element 21 through PBS 18a. Diffractive optical element 21 splits the reproducing light into a plurality of reproducing lights. Lenses 17h and 17g focus the reproducing lights in PDIC 22.

Thus, pinhole 19 blocks the unnecessary reproducing light which is emitted from layers other than the target layer. As a result, since only the reproducing light emitted from the target layer is reproduced, the quality of the reproducing process can be improved.

By the laser beam detected by PDIC 22, various types of servo controls are performed and recording data is reproduced.

Thus, since the DVD reproducing process uses the light path for the reference light of the holographic reproducing process, the number of parts can be reduced for the recording apparatus for holographic reproducing and DVD reproducing. As a result, a downsized recording apparatus can be realized.

Recording medium 10c reflects the laser beam which is recorded at DVD recording process. Since the reflected laser beam travels along the same light path as the one used in the reproducing process, the servo control is performed using data read out by PDIC 22.

Finally, the CD recording and reproducing processes will be described with reference to FIG. 17.

Figure 17:
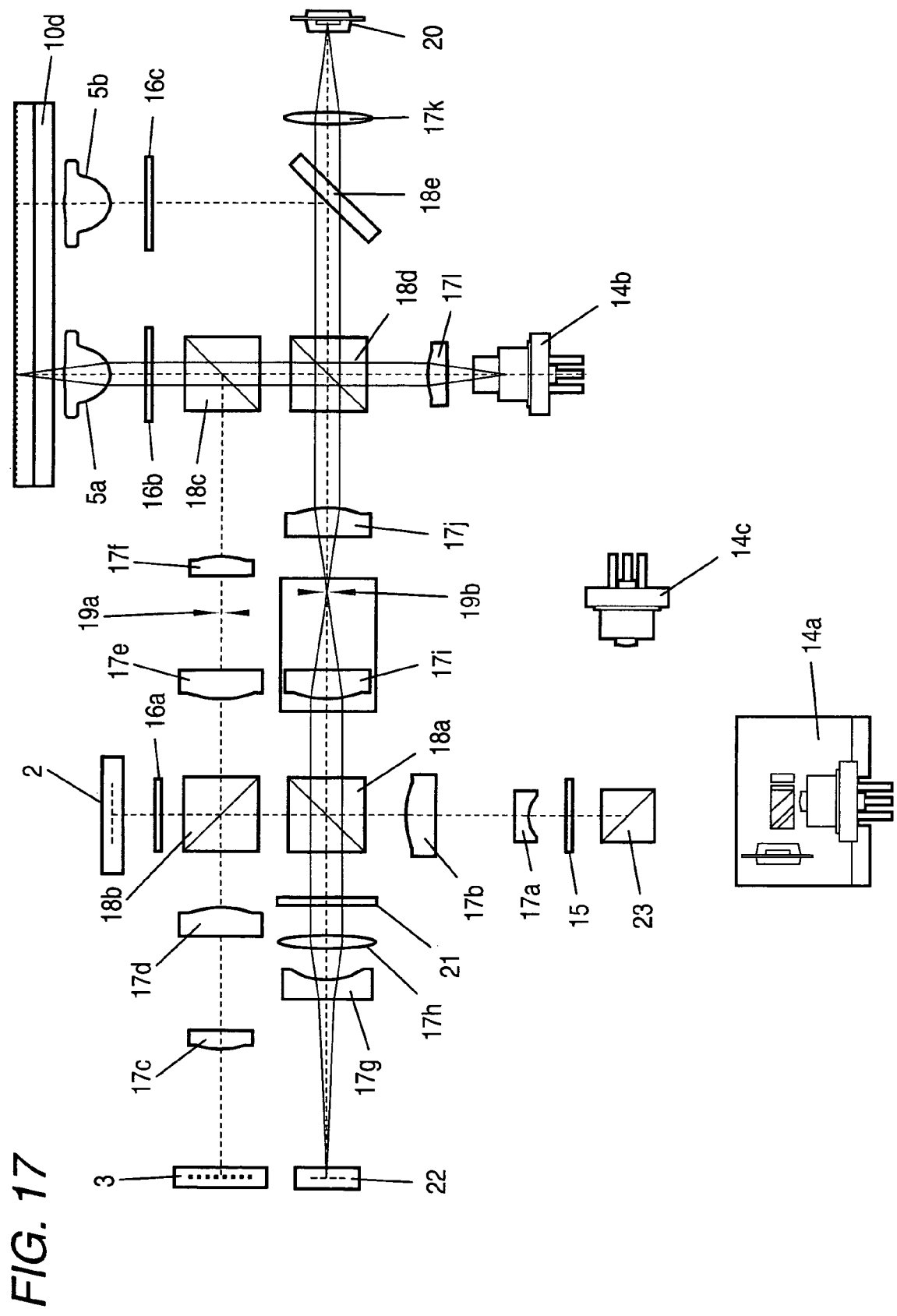
FIG. 17 illustrates a CD recording process according to the third embodiment.
Figure 18:
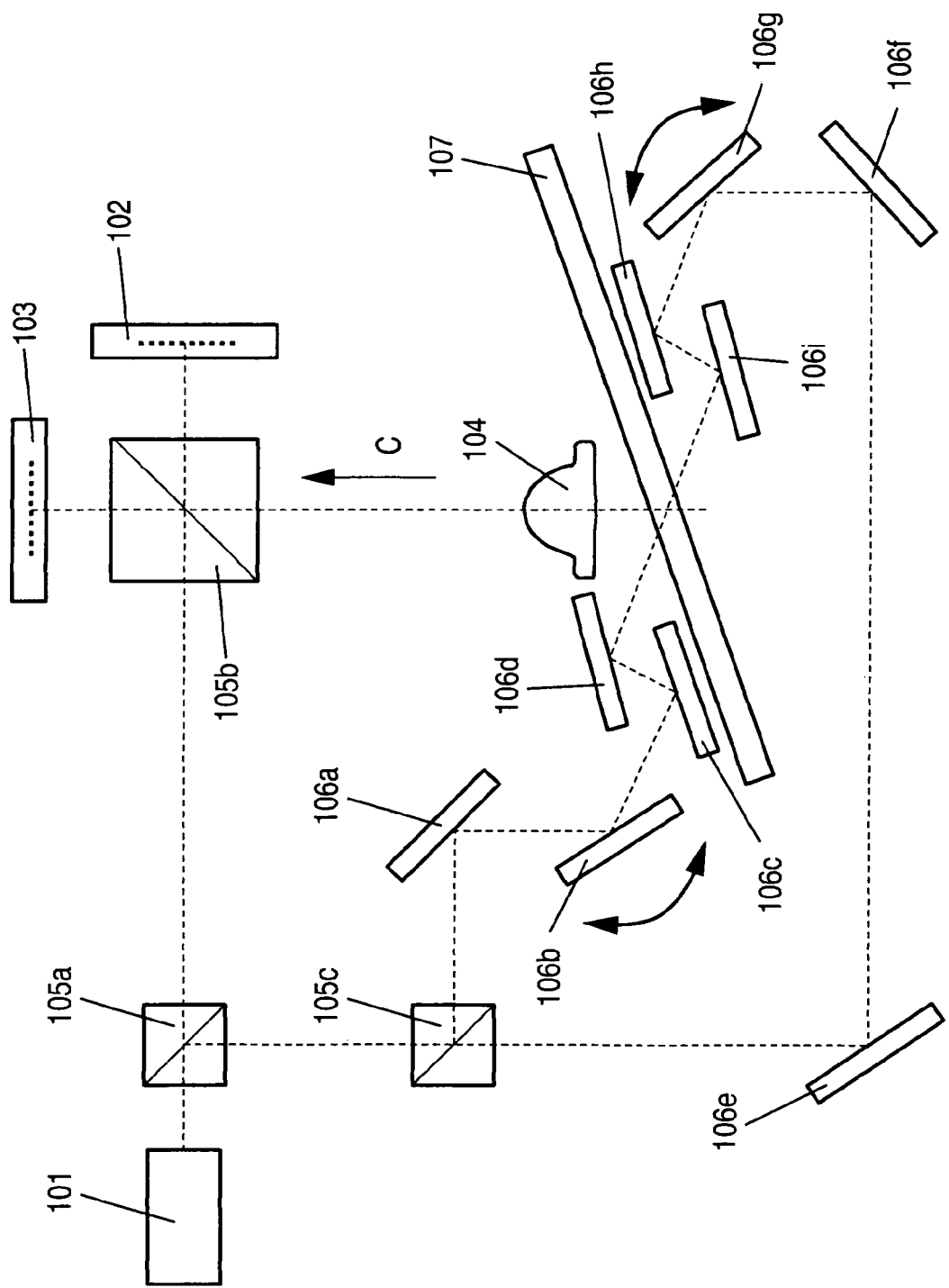
FIG. 18 illustrates a configuration of an angular multiplexed spectral holographic recording and reproducing apparatus.
Figure 19:
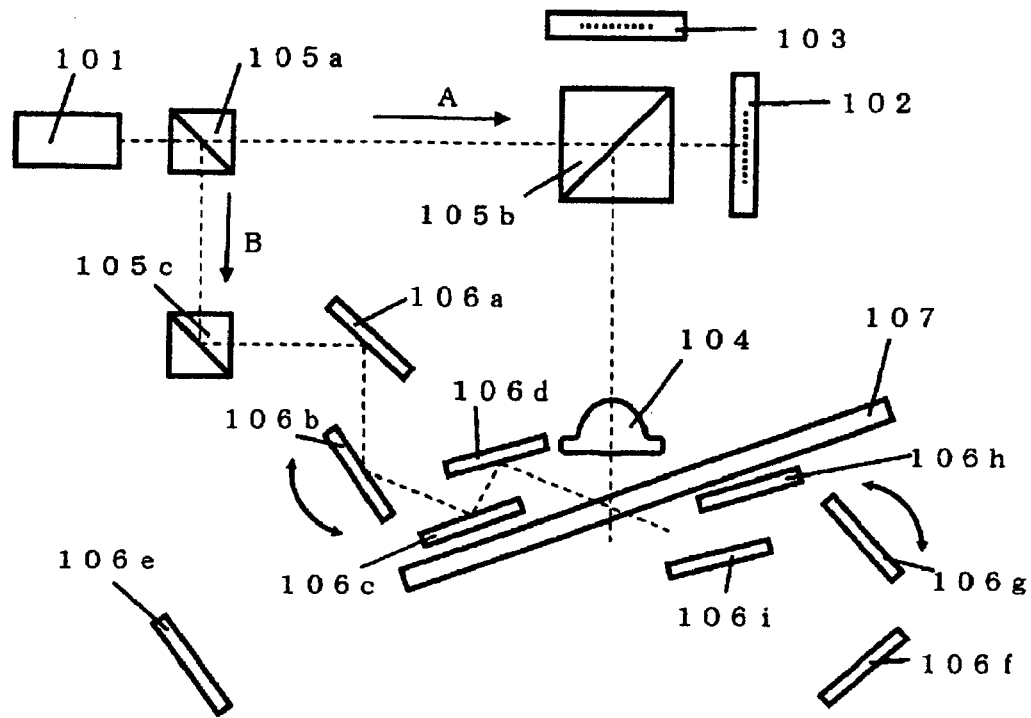
FIG. 19 illustrates a recording process of the angular multiplexed spectral holographic recording and reproducing apparatus.
Figure 20:
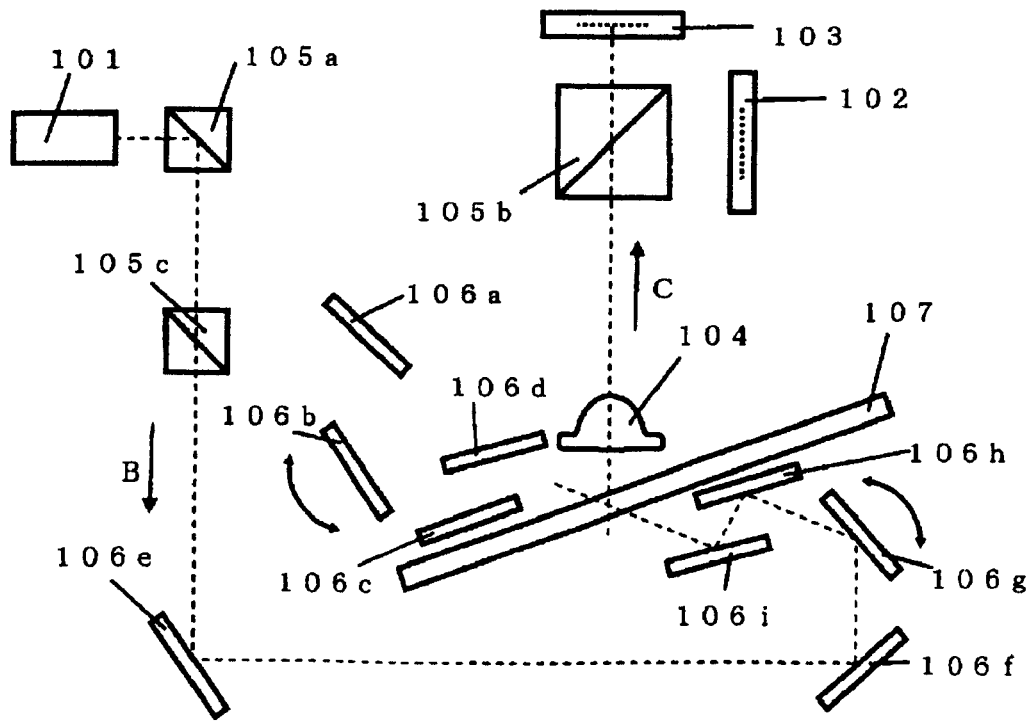
FIG. 20 illustrates a reproducing process of the angular multiplexed spectral holographic recording and reproducing apparatus.
Figure 21:
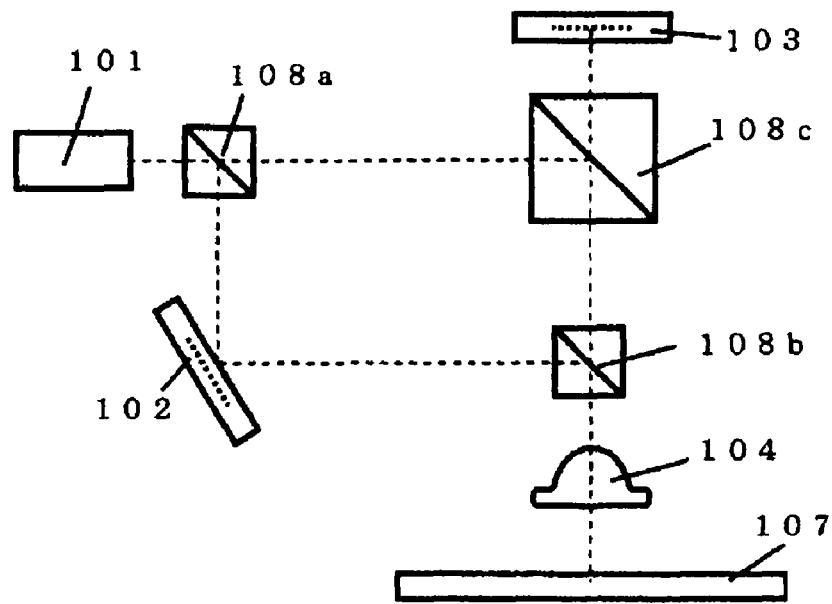
FIG. 21 illustrates a configuration of a holographic recording and reproducing apparatus.
Figure 22:
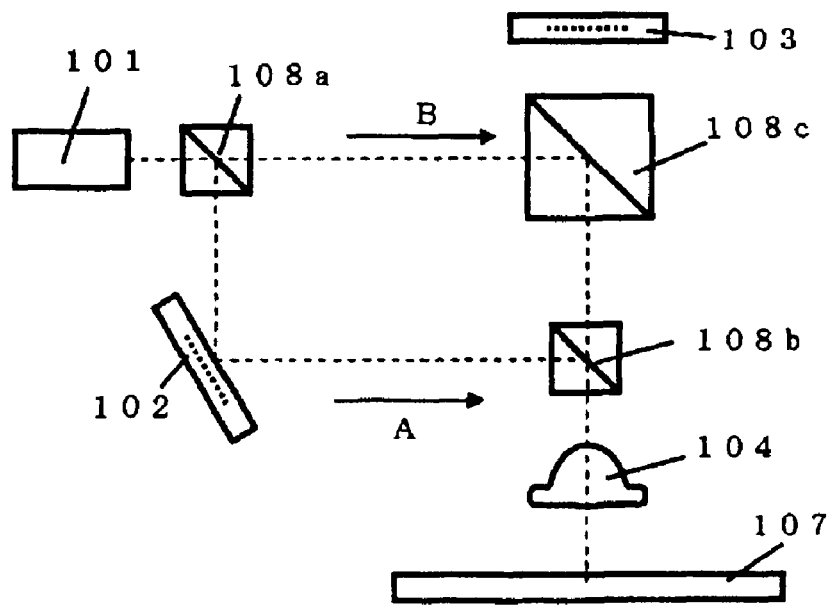
FIG. 22 illustrates a recording process of the holographic recording and reproducing apparatus.
Figure 23:
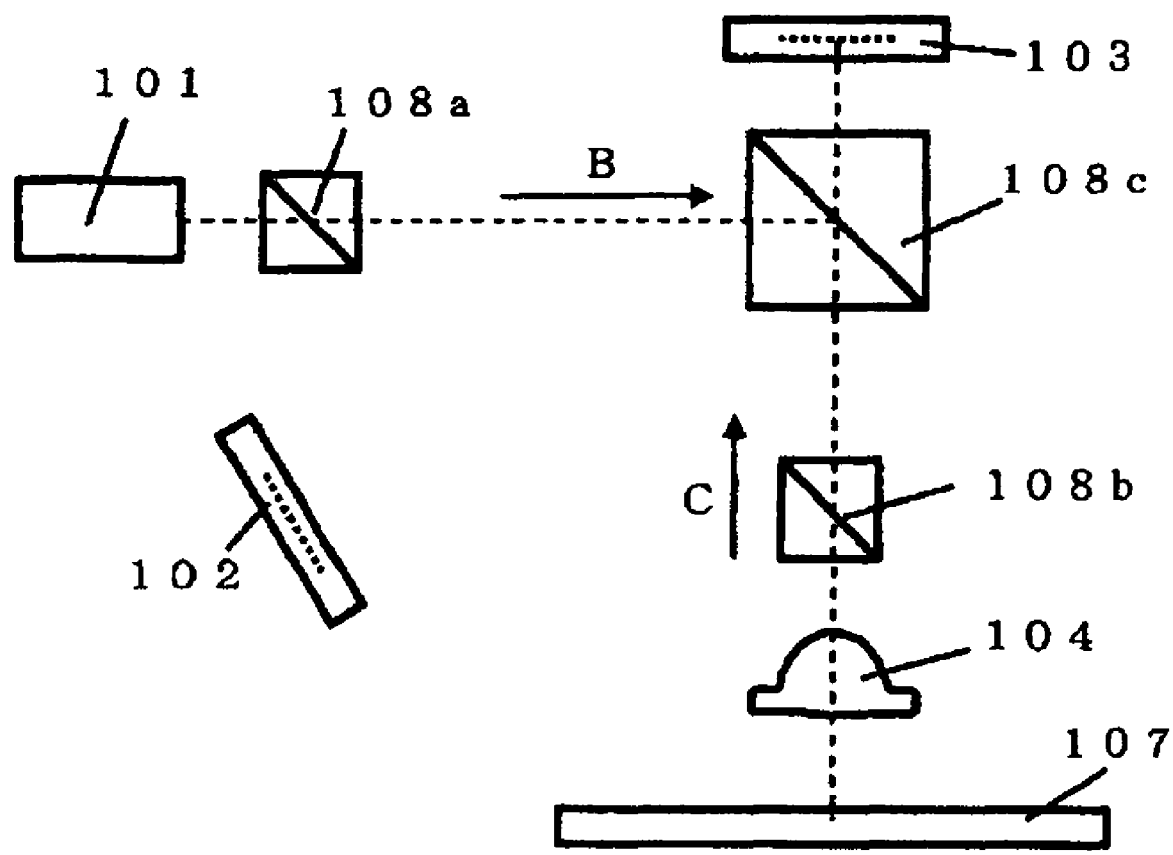
FIG. 23 illustrates a reproducing process of the holographic recording and reproducing apparatus.

Referring to FIG. 17, the light path used for CD recording process is the same as a light path used for the servo control. When CD recording medium 10d reflects the laser beam emitted from light source 14b, data is recorded in CD recording medium 10d. PDIC 22 reads out data from the reflected laser beam.

After PDIC 22 reads out data, the servo control is performed using the read data.

Also, in the recording process, CD recording medium 10d reflects the laser beam, and the reflected laser beam travels along the light path used in the reproducing process. As a result, the servo control is performed using the data read out by PDIC 22.

Further, light source 14b is shared in both the servo control of the holographic recording and reproducing processes and CD recording and reproducing processes. In order to share light source 14b, a basal plane of holographic recording medium 10a is disposed at the same position as one of a basal plane of CD recording medium 10d.

Thus, by both using light source 14b for performing the servo control of holographic recording/reproducing apparatus and sharing the light path for performing CD recording and reproducing processes, CD recording and reproducing processes can be performed without increasing the number of parts.

Further, the holographic recording/reproducing apparatus does not necessarily have three functions of recording and reproducing such as CD, DVD and BD. The holographic recording/reproducing apparatus may have at least one of the above-mentioned three functions and at least one of the relevant light sources or the light paths.

Further, light source 14a is not necessarily one for DVD recording and reproducing processes, and may be one for recording and reproducing processes other than DVD.

The foregoing description illustrates and describes the present invention. However, the disclosure shows and describes only the preferred embodiments of the invention, but it is to be understood that the invention is capable of use in various other combinations, modifications, and environments. Also, the invention is capable of change or modification, within the scope of the inventive concept, as expressed herein, that is commensurate with the above teachings and the skill or knowledge of one skilled in the relevant art. For example, one or more elements of each embodiment may be omitted or incorporated into the other embodiments.

The foregoing description of implementations and embodiments of the invention have been presented for purposes of non-limiting illustration and description. Although the present invention has been described herein with reference to particular structures, materials and embodiments, the present invention is not intended to be limited to the particular features and details disclosed herein. Rather, the present invention extends to all functionally equivalent structures, methods and uses, such as are within the scope of the appended claims. The descriptions provided herein are not exhaustive and do not limit the invention to the precise forms disclosed. The foregoing embodiment examples have been provided merely for purposes of explanation and are in no way to be construed as limiting the scope of the present invention. The words that have been used herein are words of description and illustration, rather than words of limitation. The present teachings can readily be realized and applied to other types of apparatuses. Further, modifications and variations, within the purview, scope and sprit of the appended claims and their equivalents, as presently stated and as amended hereafter, are possible in light of the above teachings or may be acquired from practicing the invention. Furthermore, although elements of the invention may be described or claimed in the singular, the plural is contemplated unless limitation to the singular is explicitly stated Alternative structures discussed for the purpose of highlighting the invention's advantages do not constitute prior art unless expressly so identified. No one or more features of the present invention are necessary or critical unless otherwise specified.

This application is based on Japanese Patent Application No. 2007-068415 filed on Mar. 16, 2007, the entire contents of which are expressly incorporated by reference herein.

What is claimed is:

1. A holographic recording apparatus for recording an interference pattern in a recording medium by causing reference light and information light to interfere with each other, said holographic recording apparatus comprising:
    an objective lens that focuses both the reference light and the information light at a focus position of the recording medium; and
    a focus position controller that changes the focus position into a predetermined position on a light path of the reference light.

2. The holographic recording apparatus according to claim 1, wherein said focus position controller moves along an optical axis of the reference light.

3. The holographic recording apparatus according to claim 1, wherein said focus position controller changes the focus position along an optical axis of the objective lens.

4. The holographic recording apparatus according to claim 1, further comprising:
a spatial light modulator that adds recording data to the information light.

5. The holographic recording apparatus according to claim 4, wherein said spatial light modulator adds the recording data to the information light by reflecting the information light.

6. The holographic recording apparatus according to claim 4, wherein said spatial light modulator adds the recording data to the information light by permitting the information light to penetrate therein.

7. The holographic recording apparatus according to claim 1, further comprising:
a first lens that receives incident light from a light source,
wherein said first lens includes a focus position changing portion that changes the focus position and a focus position holding portion that holds the focus position,
wherein the reference light is generated if the incident light penetrates said focus position changing portion, and the e information light is generated if the incident light penetrates said focus position holding portion, and
wherein said focus position changing portion is said focus position controller.

8. The holographic recording apparatus according to claim 7, wherein said focus position changing portion moves along an optical axis of the reference light.

9. The holographic recording apparatus according to claim 7, further comprising:
a splitter that splits a light path of both the information light and the reference light generated by penetrating said first lens.

10. The holographic recording apparatus according to claim 7, further comprising:
a second lens that diffuses or focuses incident light emitted from a light source,
wherein said first lens changes the light diffused or focused into parallel light.

11. The holographic recording apparatus according to claim 1, further comprising:
an optical unit that splits incident light from a light source into a first light path and a second light path,
wherein said focus position controller is provided at the first light path, the reference light is generated if the incident light penetrates the first light path, and the information light is generated if the incident light penetrates the second path.

12. The holographic recording apparatus according to claim 11, wherein said optical unit includes a first wavelength plate that converts the light into both first linear polarized light and second linear polarized light, and a dispersing unit that makes the first linear polarized light penetrate thereinto and that reflects the second linear polarized light.

13. The holographic recording apparatus according to claim 12, wherein the first linear polarized light is P polarized light and the second linear polarized light is S polarized light, or the first linear polarized light is S polarized light and the second linear polarized light is P polarized light.

14. The holographic recording apparatus according to claim 12, wherein said optical unit includes a reflecting unit that reflects the first linear polarized light in a manner such that the first linear polarized light is parallel to the second linear polarized light.

15. The holographic recording apparatus according to claim 11, further comprising:
a second lens that diffuses or focuses the incident light; and
a parallel lens that changes the light diffused or focused into parallel light.

16. The holographic recording apparatus according to claim 11, further comprising:
a focus lens that focuses light; and
a blocking unit that blocks unnecessary light,
wherein said focus lens is disposed on a light path of the information light having recording data, and said blocking unit is disposed at a focus position of the information light focused by said focus lens.

17. The holographic recording apparatus according to claim 11, wherein a light source is shared for both holographic recording and bit-by-bit recording, and the bit-by-bit recording is performed using a light path used in the holographic recording process.

18. The holographic recording apparatus according to claim 17, wherein a light path used in the bit-by-bit recording process utilizes a light path of the reference light used in the holographic recording process, and said focus position controller is utilized for multiple recording of the bit-by-bit recording process.

19. The holographic recording apparatus according to claim 17, wherein a light source for both the holographic recording and the bit-by-bit recording is a light source for DVD recording.

20. The holographic recording apparatus according to claim 1, wherein a relative position of both said objective lens and the recording medium is controlled according to reflecting light reflected on the recording medium a light source other than a light source for recording.

21. The holographic recording apparatus according to claim 20, wherein said holographic recording apparatus is compatible with bit-in-bit recording, and the light source other than a light source for recording is a light source for bit-by-bit recording.

22. The holographic recording apparatus according to claim 21, wherein the light source for bit-by-bit recording is a light source for CD recording.

23. A holographic reproducing apparatus for reproducing recording data by emitting reference light toward a recording medium, said holographic reproducing apparatus comprising:
an objective lens that focuses the reference light at a focus position of the recording medium;
a focus position controller that changes the focus position into a predetermined position on a light path of the reference light;
a reproducing unit that reproduces recording data by receiving reproducing light reflected from the recording medium; and
a second wavelength plate that changes phase of light,
wherein the reference light is changed from the first linear polarized light to circular light through said second wavelength plate, reproducing light is generated by emission of the circular light toward the recording medium, the reproducing light is converted into second linear polarized light through said second wavelength plate, and the second linear polarized light travels toward said reproducing unit.

24. The holographic reproducing apparatus according to claim 23, wherein the focus position controller changes the focus position along an optical axis of the reference light.

25. The holographic reproducing apparatus according to claim 23, wherein the focus position controller changes the focus position along an optical axis of the objective lens.

26. A holographic reproducing apparatus for reproducing recording data by emitting reference light toward a recording medium, said holographic reproducing apparatus comprising:
   an objective lens that focuses the reference light at a focus position of the recording medium;
   a focus position controller that changes the focus position into a predetermined position on a light path of the reference light;
   a reproducing unit that reproduces recording data by receiving reproducing light reflected from the recording medium;
   a first lens that receives incident light from a light source, wherein said first lens includes said focus position controller, the reference light is generated if the incident light penetrates said focus position controller, and the reference light, reflected in the recording medium travels toward said reproducing unit; and
   a second lens that diffuses or focuses incident light emitted from a light source,
   wherein said first lens changes the incident light diffused or focused into parallel light.

27. The holographic reproducing apparatus according to claim 26, wherein the reference light is the first linear polarized light, and the reference light traveling toward said reproducing unit is the second linear polarized light, the second linear polarized light being different from the first linear polarized light in polarizing direction.

28. The holographic reproducing apparatus according to claim 26, wherein the focus position moves along the optical axis.

29. The holographic reproducing apparatus according to claim 26, further comprising:
   a splitter that extracts only the reference light from the incident light emitted from a light source.

30. The holographic reproducing apparatus according to claim 29, wherein said splitter reflects the reference light and transmits the reference light toward said reproducing unit.

31. A holographic reproducing apparatus for reproducing recording data by emitting reference light toward a recording medium said holographic reproducing apparatus comprising:
   an objective lens that focuses the reference light at a focus position of the recording medium;
   a focus position controller that changes the focus position into a predetermined position on a light path of the reference light; and
   a reproducing unit that reproduces recording data by receiving reproducing light reflected from the recording medium,
   wherein said focus position controller is disposed on a light path of incident light from a light source, the reference light is generated if the incident light penetrates said focus position controller, and the reproducing light reflected in the recording medium based on the reference light is transmitted toward said reproducing unit.

32. The holographic reproducing apparatus according to claim 31, further comprising:
   a second lens that diffuses or focuses the incident light; and
   a parallel lens that changes the light diffused or focused into parallel light.

33. The holographic reproducing apparatus according to claim 31, further comprising:
   a focus lens that focuses light; and
   a blocking unit that blocks unnecessary light,
   wherein said focus lens is disposed on a light path of the information light, and said blocking unit is disposed at a focus position of the information light focused by said focus lens.

34. The holographic reproducing apparatus according to claim 31, wherein a light source for holographic recording is shared with that for bit-by-bit recording, and data recorded in the recording medium by the bit-by-bit recording is reproduced.

35. The holographic reproducing apparatus according to claim 34, wherein a light path used in a bit-by-bit reproducing process utilizes a light path of the reference light used in a holographic reproducing process, and recording data multiple-recorded by the bit-by-bit recording process is reproduced using said focus position controller.

36. The holographic reproducing apparatus according to claim 34, wherein the bit-by-bit reproducing is DVD reproducing, and a light source for both the holographic reproducing and the bit-by-bit reproducing is a light source for DVD reproducing.

37. The holographic reproducing apparatus according to claim 34, wherein said blocking unit is disposed at a focus position of the reproducing light focused by said focus position controller.

38. The holographic reproducing apparatus according to claim 23, wherein the first linear polarized light is P polarized light and the second linear polarized light is S polarized light, or the first linear polarized light is S polarized light and the second linear polarized light is P polarized light.

39. The holographic reproducing apparatus according to claim 27, wherein the first linear polarized light is P polarized light and the second linear polarized light is S polarized light, or the first linear polarized light is S polarized light and the second linear polarized light is P polarized light.

40. A holographic reproducing apparatus for reproducing recording data by emitting reference light toward a recording medium, said holographic reproducing apparatus comprising:
   an objective lens that focuses the reference light at a focus position of the recording medium;
   a focus position controller that changes the focus position into a predetermined position on a light path of the reference light; and
   a reproducing unit that reproduces recording data by receiving reproducing light reflected from the recording medium,
   wherein a relative position of both said objective lens and the recording medium is controlled according to reflecting light reflected on the recording medium using a light source other than a light source for reproducing.

41. The holographic reproducing apparatus according to claim 40, wherein said holographic recording apparatus is compatible with bit-in-bit reproducing, and the light source other than a light source for reproducing is a light source for bit-by-bit reproducing.

42. The holographic reproducing apparatus according to claim 41, wherein the light source for bit-by-bit reproducing is a light source for CD reproducing.

43. A holographic recording and reproducing apparatus for recording an interference pattern in a recording medium and for reproducing recording data recorded in the recording medium, said holographic recording and reproducing apparatus comprising:

an objective lens that focuses both the reference light and the information light at a focus position of the recording medium; and a focus position controller that changes the focus position into a predetermined position on a light path of the reference light; and a reproducing unit that reproduces recording data by receiving reproducing light reflected from the recording medium, wherein if the recording data is recorded in the recording medium by causing the reference light to interfere with the information light, the focus position of the reference light being changed by said focus position controller, and if the recording data is reproduced from the recording medium, the reference light is emitted toward the recording medium, the focus position of the reference light being changed by said focus position controller, the reference light being reflected from the recording medium is transmitted toward said reproducing unit using the identical path with the information light.

* * * * *